(12) United States Patent
Smith et al.

(10) Patent No.: US 12,294,228 B2
(45) Date of Patent: May 6, 2025

(54) SYSTEMS INCLUDING RESONATOR CIRCUITS AND METHODS FOR WIRELESS CHARGING USING SAME

(71) Applicant: University of Washington, Seattle, WA (US)

(72) Inventors: Joshua R. Smith, Seattle, WA (US); Xingyi Shi, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 17/905,163

(22) PCT Filed: Feb. 25, 2021

(86) PCT No.: PCT/US2021/019699
§ 371 (c)(1),
(2) Date: Aug. 26, 2022

(87) PCT Pub. No.: WO2021/173854
PCT Pub. Date: Sep. 2, 2021

(65) Prior Publication Data
US 2023/0144336 A1  May 11, 2023

Related U.S. Application Data

(60) Provisional application No. 62/983,033, filed on Feb. 28, 2020.

(51) Int. Cl.
*H02J 50/12* (2016.01)
*H02J 7/00* (2006.01)
(Continued)

(52) U.S. Cl.
CPC .......... *H02J 50/502* (2020.01); *H02J 7/0063* (2013.01); *H02J 7/342* (2020.01); *H02J 50/005* (2020.01);
(Continued)

(58) Field of Classification Search
CPC ........ H02J 7/0063; H02J 7/342; H02J 50/005; H02J 50/10; H02J 50/12; H02J 50/50; H02J 50/502; H02J 50/80; H02J 50/90
See application file for complete search history.

(56) References Cited

U.S. PATENT DOCUMENTS 9,680,336 B2 * 6/2017 Bae .................. H02J 50/502
11,133,714 B1 * 9/2021 Boulanger ............ H02J 50/005
(Continued)

FOREIGN PATENT DOCUMENTS

CN      207719409 U    8/2018
JP      2017099263 A   6/2017
(Continued)

OTHER PUBLICATIONS

"A4WP Rezence Speciation", Technical Report V1, Alliance for Wireless Power | http://www.rezence.com/technology/technical-speci_cation, 2014.
(Continued)

*Primary Examiner* — Levi Gannon
(74) *Attorney, Agent, or Firm* — Stoel Rives LLP

(57) ABSTRACT

Examples of charging systems are described which may utilize a network of resonator circuits. Control methods are described which may locate a charging location at which an electronic device is placed proximate the charging system and identify a path of resonator circuits to activate to charge the electronic device. Individual resonator circuits in the path may be activated by selecting a resonant frequency of the resonator circuit such that power may be transferred by the resonator circuit at an operating frequency.

27 Claims, 7 Drawing Sheets

(51) Int. Cl.
| H02J 7/34 | (2006.01) |
| H02J 50/00 | (2016.01) |
| H02J 50/50 | (2016.01) |
| H02J 50/80 | (2016.01) |
| H02J 50/90 | (2016.01) |

(52) U.S. Cl.
CPC .............. *H02J 50/12* (2016.02); *H02J 50/80* (2016.02); *H02J 50/90* (2016.02)

(56) References Cited

U.S. PATENT DOCUMENTS

| | | | |
|---|---|---|---|
| 2004/0106963 A1 | 6/2004 | Tsukamoto et al. | |
| 2010/0052431 A1* | 3/2010 | Mita | B60L 53/12 307/104 |
| 2010/0201314 A1* | 8/2010 | Toncich | H02J 50/20 320/108 |
| 2011/0181120 A1* | 7/2011 | Liu | H02J 50/50 307/104 |
| 2012/0010079 A1* | 1/2012 | Sedwick | H02J 50/50 307/104 |
| 2012/0161541 A1* | 6/2012 | Urano | H02J 50/40 307/104 |
| 2014/0028112 A1* | 1/2014 | Hui | H02J 50/12 307/104 |
| 2014/0092633 A1 | 4/2014 | Arnold et al. | |
| 2014/0125145 A1* | 5/2014 | Bae | H04B 5/00 307/104 |
| 2014/0142876 A1* | 5/2014 | John | H02J 50/001 307/104 |
| 2015/0380978 A1 | 12/2015 | Toivola et al. | |
| 2016/0134154 A1 | 5/2016 | Baarman et al. | |
| 2017/0194809 A1 | 7/2017 | Partovi et al. | |
| 2018/0122567 A1 | 5/2018 | Hall et al. | |
| 2019/0006887 A1* | 1/2019 | Hosotani | H02J 50/12 |
| 2020/0313464 A1 | 10/2020 | Leabman | |

FOREIGN PATENT DOCUMENTS

| JP | 2020099181 A | 6/2020 |
|---|---|---|
| KR | 20140006353 A | 1/2014 |
| KR | 20190133807 A | 12/2019 |
| WO | 2020125173 A1 | 6/2020 |
| WO | 2020132139 A1 | 6/2020 |

OTHER PUBLICATIONS

"Airfuel Inc.", AirFuel Alliance | https://www.airfuel.org/about/., accessed Aug. 15, 2018, pp. 1-7.

"ICNIRP Guidelines for Limiting Exposure to Time-Varying Electric, Magnetic and Electromagnetic Fields (Up to 300 GHZ)", Health Physics 74 (4), 1998, pp. 484-522.

"ITIS Database for Tissue Properties", http://www.itis.ethz.ch/itis-for-health/tissue-properties/database/density/, Accessed: Feb. 2015, pp. 1-6.

"The Qi Wireless Power Transfer System Power Class O Specification Parts 1 and 2: Interface Definitions", Technical Report V1.1.2 | Wireless Power Consortium | http://www.wirelesspowerconsortium.com/downloads/wireless-power-specification-part-1.html., 2014.

Arteaga, Juan H. et al., "Dynamic Capabilities of Multi-MHz Inductive Power Transfer Systems Demonstrated With Batteryless Drones", IEEE Transactions on Power Electronics, vol. 34, No. 6 | https://doi.org/10.1109/TPEL.2018.2871188, Jun. 2019, pp. 5093-5104.

Atluri, Suresh et al., "A Wideband Power-Efficient Inductive Wireless Link for Implantable Microelectronic Devices Using Multiple Carriers", ISCAS 2006. Proceedings. 2006 IEEE International Symposium, May 2006, pp. 1131-1134.

Babic, Slobodan I. et al., "Calculating Mutual Inductance Between Circular Coils With Inclined Axes in Air", IEEE Transactions on Magnetics, vol. 44, No. 7, Jul. 2008, pp. 1743-1750.

Besnoff, Jordan et al., "High Data-Rate Communication in Near-Field RFID and Wireless Power Using Higher Order Modulation", IEEE Transactions on Microwave Theory and Techniques, vol. 64, No. 2, Feb. 2016, pp. 401-413.

Besnoff, Jordan et al., "Near Field Wireless Power Transfer and Quadrature Amplitude Modulated (QAM) Communication Link", In 2015 IEEE Wireless Power Transfer Conference (WPTC), May 2015, pp. 1-4.

Besnoff, Jordan et al., "Ultrahigh-Data-Rate Communication and Efficient Wireless Power Transfer at 13.56 MHz", IEEE Antennas and Wireless Propagation Letters, vol. 16, 2017, pp. 2634-2637.

Bi, Suzhi et al., "Wireless Powered Communication: Opportunities and Challenges", IEEE Communications Magazine | https://doi.org/10.1109/MCOM.2015.7081084, Apr. 2015, pp. 117-125.

Brown, William C., "Experiments Involving a Microwave Beam to Power and Position a Helicopter", IEEE Transactions on Aerospace and Electronic Systems, AES-5(5), Sep. 1969, pp. 692-702.

Brown, William C., "History and Status of Beamed Power Technology and Applications at 2.45 Gigahertz", Technical report, Microwave and Power Tube Division, Raytheon Company, 190 Willow Street, Waltham, MA., 1989, pp. 171-185.

Brown, William C., "The History of Power Transmission by Radio Waves", IEEE Transactions on Microwave Theory and Techniques 32, 9 | https://doi.org/10.1109/TMTT.1984.1132833, Sep. 1984, pp. 1230-1242.

Cao, Yuan et al., "Dynamic Efficiency Tracking Controller for Reconfigurable Four-coil Wireless Power Transfer System", 2016 IEEE Applied Power Electronics Conference and Exposition (APEC) | doi: 10.1109/APEC.2016.7468400., Mar. 24, 2016, pp. 3684-3689.

Casanova, Joaquin J. et al., "Design and Optimization of a Class-E Amplifier for a Loosely Coupled Planar Wireless Power System", IEEE Transactions on Circuits and Systems-II: Express Briefs, vol. 56, No. 11, Nov. 2009, pp. 830-834.

Casanova, Joaquin J. et al., "Transmitting Coil Achieving Uniform Magnetic Field Distribution for Planar Wireless Power Transfer System", 2009 IEEE Radio and Wireless Symposium, Jan. 2009, pp. 530-533.

Chabalko, Matthew J. et al., "Quasistatic Cavity Resonance for Ubiquitous Wireless Power Transfer", Power Transfer. PloS One 12, 2 | https://doi.org/10.1371/journal.pone.0169045, Feb. 15, 2017, pp. 1-14.

Cheng, Yuhua et al., "A New Analytical Calculation of the Mutual Inductance of the Coaxial Spiral Rectangular Coils", IEEE Transactions on Magnetics, vol. 50, No. 4, Apr. 6, 2014, pp. 1-6.

Christ, Andreas et al., "Evaluation of Wireless Resonant Power Transfer Systems With Human Electromagnetic Exposure Limits", IEEE Transactions on Electromagnetic Compatibility, vol. 55, No. 2, Apr. 2013, pp. 265-274.

Christ, Andreas et al., "The Virtual Family—development of surface-based anatomical models of two adults and two children for dosimetric simulations", Physics in Medicine and Biology, 55(2) | doi: 10.1088/0031-9155/55/2/N01, 2010, pp. N23-N28.

Dang, Zhigang et al., "Reconfigurable Magnetic Resonance-Coupled Wireless Power Transfer System", IEEE Transactions on Power Electronics, vol. 30, No. 11 | doi: 10.1109/TPEL.2015.2422776., Nov. 11, 2015, pp. 6057-6069.

Fan, Xiaoran et al., "Energy-Ball: Wireless Power Transfer for Batteryless Internet of Things through Distributed Beamforming", Proceedings of the ACM Interactive Mobility, Wearable, and Ubiquitous Technology vol. 2, No. 2, Article 65 | https://doi.org/10.1145/3214268, Jul. 2018, pp. 1-65.

Gabriel, C. et al., "The dielectric properties of biological tissues: I. literature survey", Physics in Medicine and Biology, 41(11), 1996, pp. 2231-2249.

Grover, Pulkit et al., "Shannon meets Tesla: Wireless information and power transfer", In Information Theory Proceedings (ISIT), 2010 IEEE International Symposium, Jun. 2010, pp. 2363-2367.

Han, Minseok et al., "High Efficient Rectenna Using a Harmonic Rejection Low Pass Filter for RF based Wireless Power Transmission", 11th International Symposium on Wireless Communications Systems (ISWCS), Barcelona, Spain | doi: 10.1109/ISWCS.2014.6933390, 2014, pp. 423-426.

(56) References Cited

OTHER PUBLICATIONS

Hashizume, Arata et al., "Receiver Localization for a Wireless Power Transfer System with a 2D Relay Resonator Array", 2017 IEEE International Conference on Computational Electromagnetics (ICCEM), Mar. 2017, pp. 127-129.

Ho, John S. et al., "Self-Tracking Energy Transfer for Neural Stimulation in Untethered Mice", Phys. Rev. Applied, 4:024001, Aug. 2015, pp. 1-6.

Hong, Jia-Sheng et al., "Microstrip Filters for RF/Microwave Applications", Wiley, 1st edition, 2001, pp. 1-457.

Hui, Shu Yuen R. et al., "A Critical Review of Recent Progress in Mid-Range Wireless Power Transfer", IEEE Transactions on Power Electronics, vol. 29, No. 9 | https://doi.org/10.1109/TPEL.2013.2249670, Sep. 2014, pp. 4500-4511.

Jabbar, Hamid et al., "RF Energy Harvesting System and Circuits for Charging of Mobile Devices", IEEE Transactions on Consumer Electronics, vol. 56, No. 1 | https://doi.org/10.1109/TCE.2010.5439152, Feb. 2010, pp. 247-253.

Jadidian, Jouya et al., "Magnetic MIMO: How To Charge Your Phone in Your Pocket", In Proceedings of the 20thAnnual International Conference on Mobile Computing and Networking (MobiCom '14). ACM, New York, NY, USA https://doi.org/10.1145/2639108.2639130, 2014, pp. 495-506.

Jolani, Farid et al., "A Planar Positioning-Free Magnetically-Coupled Resonant Wireless Power Transfer", IEEE Wireless Power Transfer Conference (WPTC) | https://doi.org/10.1109/WPT.2015.7140176, 2015, pp. 1-3.

Kawahara, Yoshihiro et al., "Virtualizing Power Cords by Wireless Power Transmission and Energy Harvesting", IEEE Radio and Wireless Symposium | https://doi.org/10.1109/RWS.2013.6486633, 2013, pp. 37-39.

Kiani, Mehdi et al., "Design and Optimization of a 3-Coil Inductive Link for Efficient Wireless Power Transmission", IEEE Trans Biomed Circuits Syst, 99:1 | doi:10.1109/TBCAS.2011.2158431., Jul. 14, 2011, pp. 1-36.

Kiani, Mehdi et al., "The Circuit Theory Behind Coupled-Mode Magnetic Resonance-Based Wireless Power Transmission", IEEE Transactions on Circuits and Systems I: Regular Papers 59, 9 | https://doi.org/10.1109/TCSI.2011.2180446, Sep. 2012, pp. 2065-2074.

Kim, Jinwook et al., "Efficiency Analysis of Magnetic Resonance Wireless Power Transfer With Intermediate Resonant Coil", IEEE Antennas and Wireless Propagation Letters, 10:389, 2011, pp. 389-392.

Kim, Sangkil et al., "Ambient RF Energy-Harvesting Technologies for Self-Sustainable Standalone Wireless Sensor Platforms", Proc. IEEE 102, 11 | https://doi.org/10.1109/JPROC.2014.2357031, Nov. 2014, pp. 1649-1666.

Kisseleff, S. et al., "Beamforming for Magnetic Induction based Wireless Power Transfer Systems with Multiple Receivers", Proceedings of the 2015 IEEE Global Commun. Conf. (GLOBECOM) | https://doi.org/10.1109/GLOCOM.2015.7417006, Dec. 2015, pp. 1-7.

Kobayashi, Ryosuke et al., "Performance Evaluation of Multilevel ASK Communication for a Multi-hop Wireless Resonance System", In 2014 IEEE Wireless Power Transfer Conference | https://doi.org/10.1109/WPT.2014.6839598, 2014, pp. 76-79.

Kurs, André et al., "Wireless Power Transfer via Strongly Coupled Magnetic Resonances", Science, vol. 317, No. 5834, 2007, pp. 83-86.

Lee, Byunghun et al., "Towards a Three-Phase Time-Multiplexed Planar Power Transmission to Distributed Implants", In Circuits and Systems (ISCAS) | 2015 IEEE International Symposium, May 2015, pp. 1770-1773.

Lee, CK et al., "Effects of magnetic coupling of nonadjacent resonators on wireless power domino-resonator systems", IEEE Transactions on Power Electronics, vol. 27, No. 4 | http://hdl.handle.net/10722/155734, Apr. 2012, pp. 1905-1916.

Lee, Gunbok et al., "A Reconfigurable Resonant Coil for Range Adaptation Wireless Power Transfer", IEEE Transactions on Microwave Theory and Techniques, vol. 64, No. 2 |, Feb. 2, 2016, pp. 624-632.

Lee, Kibok et al., "Reflexive Field Containment in Dynamic Inductive Power Transfer Systems", IEEE Transactions on Power Electronics, vol. 29, No. 9 | doi: 10.1109/TPEL.2013.2287262, Sep. 2014, pp. 4592-4602.

Li, Xing et al., "A 13.56 MHz Wireless Power Transfer System With Reconfigurable Resonant Regulating Rectifier and Wireless Power Control for Implantable Medical Devices", IEEE Journal of Solid-State Circuits, vol. 50, No. 4 | doi: 10.1109/JSSC.2014.2387832, Apr. 4, 2015, pp. 978-989.

Liu, Zhu et al., "A Shape-Reconfigurable Modularized Wireless Power Transfer Array System for Multipurpose Wireless Charging Applications", IEEE Transactions on Antennas and Propagation, vol. 66, No. 8 | doi: 10.1109/TAP.2018.2839350., Aug. 8, 2018, pp. 4252-4259.

Liu, Zhu et al., "A Simple Structure of Planar Transmitting Array for Multi-Receiver Wireless Power Reception", IEEE Wireless Power Transfer Conference (WPTC) | https://doi.org/10.1109/WPT.2017.7953895, 2017, pp. 1-2.

Low, Zhen N. et al., "Design and Test of a High-Power High-Efficiency Loosely Coupled Planar Wireless Power Transfer System", IEEE Transactions on Industrial Electronics, vol. 56, No. 5, May 2009, pp. 1801-1812.

Mandal, Soumyajit et al., "Power-Efficient Impedance-Modulation Wireless Data Links for Biomedical Implants", IEEE Transactions on Biomedical Circuits and Systems, vol. 2, No. 4, Dec. 2008, pp. 301-315.

Masotti, Diego et al., "Time-Modulation of Linear Arrays for Real-Time Reconfigurable Wireless Power Transmission", IEEE Transactions on Microwave Theory and Techniques, vol. 64, No. 2, Feb. 2016, pp. 331-342.

Massa, Andrea et al., "Array Designs for Long-Distance Wireless Power Transmission: State-of-the-Art and Innovative Solutions", Proc. IEEE 101 | https://doi.org/10.1109/JPROC.2013.2245491, Jun. 6, 2013, pp. 1464-1481.

Matsumoto, Hiroshi, "Research on solar power satellites and microwave power transmission in Japan", IEEE Microwave Magazine 3(4) | https://doi.org/10.1109/MMW.2002.1145674, Dec. 2002, pp. 36-45.

Mirbozorgi, Abdollah S. et al., "A Smart Cage With Uniform Wireless Power Distribution in 3D for Enabling Long-Term Experiments With Freely Moving Animals", IEEE Transactions on Biomedical Circuits and Systems, vol. 10, No. 2 | https://doi.org/10.1109/TBCAS.2015.2414276, Apr. 2016, pp. 424-434.

Mori, Kazuaki et al., "Positioning-Free Resonant Wireless Power Transmission Sheet With Staggered Repeater Coil Array (SRCA)", IEEE Antennas and Wireless Propagation Letters, vol. 11 | https://doi.org/10.1109/LAWP.2013.2239600, 2012, pp. 1710-1713.

Nakamura, Sousuke, "Efficient Wireless Power Transmission Based on Position Sensing Using Magnetic Resonance Coupling", SICE Journal of Control, Measurement, and System Integration, vol. 5, No. 3 | https://doi.org/10.9746/jcmsi.5.153, May 2012, pp. 153-161.

Narusue, Yoshiaki et al., "Distributed Reactance Compensation for Printed Spiral Coils in Wireless Power Transfer", IEEE Wireless Power Transfer Conference (WPTC) | https://doi.org/10.1109/WPT.2017.7953904, 2017, pp. 1-4.

Narusue, Yoshiaki et al., "Impedance Matching Method for Any-Hop Straight Wireless Power Transmission Using Magnetic Resonance", IEEE Radio and Wireless Symposium | https://doi.org/10.1109/RWS.2013.6486685, 2013, pp. 193-195.

Narusue, Yoshiaki et al., "Maximizing the efficiency of wireless power transfer with a receiver-side switching voltage regulator", Wireless Power Transfer 4(1) | doi:10.1017/wpt.2016.14, 2017, pp. 42-54.

Onar, Omer C. et al., "A Novel Wireless Power Transfer for In-Motion EV/PHEV Charging", 2013 Twenty-Eighth Annual IEEE Applied Power Electronics Conference and Exposition (APEC), Long Beach, CA, USA | doi: 10.1109/APEC.2013.652073, 2013, pp. 3073-3080.

(56) References Cited

OTHER PUBLICATIONS

Park, Sangwook et al., "Dosimetry for Two modes of Resonance-based Wireless Power Transfer System", In Electromagnetic Compatibility, Tokyo (EMC'14/Tokyo), 2014 International Symposium, May 2014, pp. 210-213.

Parks, Aaron N. et al., "A Wireless Sensing Platform Utilizing Ambient RF Energy", 2013 IEEE Topical Conference on Biomedical Wireless Technologies, Networks, and Sensing Systems | https://doi.org/10.1109/BioWireleSS.2013.6613706, 2013, pp. 154-156.

Plaizier, Gregory M., "Design, Modeling, and Analysis of Inductive Resonant Coupling Wireless Power Transfer for Micro Aerial Vehicles (MAVs)", IEEE International Conference on Robotics and Automation (ICRA) | https://doi.org/10.1109/ICRA.2018.8461162, May 2018, pp. 6104-6109.

Ricketts, David S. et al., "Experimental demonstration of the equivalence of inductive and strongly coupled magnetic resonance wireless power transfer", Applied Physics Letters 102 | https://doi.org/10.1063/1.4788748, Jan. 2013, pp. 1-5.

Sample, Alanson P. et al., "Analysis, Experimental Results, and Range Adaptation of Magnetically Coupled Resonators for Wireless Power Transfer", IEEE Transactions on Industrial Electronics, vol. 58, No. 2, Feb. 2011, pp. 544-554.

Sample, Alanson P. et al., "Design of an RFID-Based Battery-Free Programmable Sensing Platform", IEEE Transactions on Instrumentation and Measurement, vol. 57, No. 11 | https://doi.org/10.1109/TIM.2008.925019, Nov. 2008, pp. 2608-2615.

Sample, Alanson P. et al., "Enabling Seamless Wireless Power Delivery in Dynamic Environments", Proceedings of the IEEE, 101(6), Jun. 2013, pp. 1343-1358.

Sasatani, Takuya et al., "Multimode Quasistatic Cavity Resonators for Wireless Power Transfer", IEEE Antennas and Wireless Propagation Letters, vol. 16 | https://doi.org/10.1109/LAWP.2017.2744658, Aug. 2017, pp. 2746-2749.

Sasatani, Takuya et al., "Room-Wide Wireless Charging and Load-Modulation Communication via Quasistatic Cavity Resonance", Proc. ACM Interact. Mob. Wearable Ubiquitous Technol., vol. 2, No. 4, Article 188 | https://doi.org/10.1145/3287066, Dec. 2018, pp. 1-23.

Scott, James et al., "Networked Surfaces: A New Concept in Mobile Networking", ACM Mobile Networks and Applications 7, No. 5 | https://doi.org/10.1109/MCSA.2000.895377, 2002, pp. 11-18.

Sekitani, Tsuyoshi et al., "A large-area wireless power-transmission sheet using printed organic transistors and plastic MEMS switches", Nature materials 6, 6 | doi: 10.1038/nmat1903, Apr. 29, 2007, pp. 413-417.

Shi, Lei et al., "Design and Experiment of a Reconfigurable Magnetic Resonance Coupling Wireless Power Transmission System", IEEE Microwave and Wireless Components Letters, vol. 30, No. 7, Jul. 2020, pp. 705-708.

Shi, Lixin et al., "Wireless Power Hotspot that Charges All of Your Devices", In Proceedings of the 21st Annual International Conference on Mobile Computing and Networking (MobiCom '15). ACM, New York, NY, USA | https://doi.org/10.1145/2789168.2790092, 2015, pp. 1-12.

Shi, Xingyi et al., "Coil Geometry Optimization for Wireless Power Delivery to Moving Receivers", In 2018 IEEE Wireless Power Transfer Conference (WPTC), Jun. 2018, pp. 1-4.

Shi, Xingyi et al., "Co-optimization of Efficiency and Load Modulation Data Rate in a Wireless Power Transfer System", 2015 IEEE International Symposium on Circuits and Systems (ISCAS), May 2015, pp. 698-701.

Shi, Xingyi , "Large Area Wireless Power Transfer with Coupled Relay Resonators", University of Washington | Computer Science & Engineering and Electrical & Computer Engineering, 2019, pp. 1-155.

Shi, Xingyi et al., "Large Area Wireless Power via a Planar Array of Coupled Resonators", 2016 International Workshop on Antenna Technology (iWAT) | https://doi.org/10.1109/IWAT.2016.7434842, Feb. 2016, pp. 200-203.

Shi, Xingyi et al., "Reconfigurable and Adaptive Coupled Relay Resonator Platform for a Moving Receiver", 2019 International Workshop on Antenna Technology (iWAT), Miami, FL, USA | doi: 10.1109/IWAT.2019.8730619., 2019, pp. 182-185.

Shi, Xingyi et al., "SAR Distribution for a Strongly Coupled Resonant Wireless Power Transfer System", In 2015 IEEE Wireless Power Transfer Conference (WPTC), May 2015, pp. 1-4.

Shigeta, Ryo et al., "Ambient RF Energy Harvesting Sensor Device With Capacitor-Leakage-Aware Duty Cycle Control", IEEE Sensors Journal, vol. 13, No. 8 | https://doi.org/10.1109/JSEN.2013.2264931, Aug. 2013, pp. 2973-2983.

Shin, Jaegue et al., "Design and Implementation of Shaped Magnetic-Resonance-Based Wireless Power Transfer System for Roadway-Powered Moving Electric Vehicles", IEEE Transactions on Industrial Electronics, vol. 61, No. 3 | https://doi.org/10.1109/TIE.2013.2258294, Mar. 2014, pp. 1179-1192.

Shinohara, Naoki et al., "Recent Wireless Power Transmission Technologies in Japan for Space Solar Power Station/Satellite", 2009 IEEE Radio and Wireless Symposium | https://doi.org/10.1109/RWS.2009.4957272, 2009, pp. 13-15.

Shinohara, Naoki et al., "Study on Ubiquitous Power Source with Microwave Power Transmission", In Proc. URSI General Assembly. C07., 2005, pp. 1-4.

Shinohara, Naoki Shinohara , "Power without wires", IEEE Microwave Magazine 12, 7 | https://doi.org/10.1109/MMM.2011.942732, Dec. 2011, pp. S64-S73.

Smith, Richard M. , "Report and Order, FCC 96-326", Federal Communications Commission|In the Matter of Amendment of the Commission's Guidelines for Evaluating the Environmental Effects of Radio Frequency Radiation|https://transition.fcc.gov/Bureaus/Engineering_Technology/Orders/1996/fcc96326.pdf., Nov. 29, 1996, p. 1.

Sumiya, Kazunobu et al., "Alvus: A Reconfigurable 2-D Wireless Charging System", Proceedings of the ACM Interactive, Mobile, Werable and Ubiquitous Technologies: vol. 3, No. 2, Article 68 https://doi.org/10.1145/3332533, Jun. 2019, pp. 1-29.

Takahashi, Ryo et al., "A Cuttable Wireless Power Transfer Sheet", Procceedings on the ACM Interactive, Mobility, Wearable and Ubiquitous Technology, vol. 2, No. 4, Article 190 | https://doi.org/10.1145/3287068, Dec. 2018, pp. 1-25.

Takamiya, Makoto et al., "Design Solutions for a Multi-Object Wireless Power Transmission Sheet Based on Plastic Switches", IEEE International Solid-State Circuits Conference. Digest of Technical Papers | https://doi.org/10.1109/ISSCC.2007.373444, Feb. 13, 2007, pp. 362-363; 609.

Talla, Vamsi et al., "Battery-Free Cellphone", Proceedings of the ACM on Interactive, Mobile, Wearable and Ubiquitous Technologies (IMWUT) 1, 2, Article 25 | DOI: http://doi.org/10.1145/3090090, Jun. 2017, pp. 1-20.

Talla, Vamsi et al., "Dual Band Wireless Power and Bi-Directional Data Link for Implanted Devices in 65 nm CMOS", 2016 IEEE International Symposium on Circuits and Systems (ISCAS), May 2016, pp. 658-661.

Tanaka, Susumu et al., "Microwave Power Transmission Technologies for Solar Power Satellites", Proc. IEEE 101 | https://doi.org/10.1109/JPROC.2013.2246851, Jun. 2013, pp. 1438-1447.

Tesla, Nikola , "The Future of the Wireless Art", In Wireless telegraphy & telephony, 1908, pp. 67-71.

Wageningen, Dries V. et al., "The Qi Wireless Power Standard", 14th International Power Electronics and Motion Control Conference, EPE-PEMC | https://doi.org/10.1109/EPEPEMC.2010.5606673, 2010, pp. S15-S25.

Wang, Bingnan et al., "Wireless Power Transfer: Metamaterials and Array of Coupled Resonators", Proceedings of the IEEE, 101(6), Jun. 2013, pp. 1359-1368.

Wang, D. et al., "Analysis on wireless power transfer to moving devices based on array of resonators", 6th European Conference on Antennas and Propagation (EUCAP), Mar. 2012, pp. 964-967.

Waters, Benjamin , "Adaptive Wireless Power for Ventricular Assist Devices", University of Washington | Department of Electrical Engineering, 2015, pp. 1-161.

(56) References Cited

OTHER PUBLICATIONS

Waters, Benjamin H. et al., "Innovative Free-Range Resonant Electrical Energy Delivery System (FREE-D System) for a Ventricular Assist Device Using Wireless Power", ASAIO Journal, No. 1, 2014, pp. 31-37.

Waters, Benjamin H. et al., "Optimal Coil Size Ratios for Wireless Power Transfer Applications", 2014 IEEE International Symposium on Circuits and Systems (ISCAS), Jun. 2014, pp. 2045-2048.

Waters, Benjamin H. et al., "Power Delivery and Leakage Field Control Using an Adaptive Phased Array Wireless Power System", IEEE Transactions on Power Electronics, vol. 30, No. 11, Nov. 2015, pp. 6298-6309.

Waters, Benjamin H. et al., "Powering a Ventricular Assist Device (VAD)With the Free-Range Resonant Electrical Energy Delivery (FREE-D) System", Proceedings of the IEEE, 100(1), Jan. 2012, pp. 138-149.

Waters, Benjamin H. et al., "Simultaneously Tuning and Powering Multiple Wirelessly Powered Devices", In Wireless Power Transfer Conference (WPTC), 2015 IEEE, May 2015, pp. 1-4.

Yang, Ching-Wen et al., "Analysis of Inductive Coupling Coils for Extending Distances of Efficient Wireless Power Transmission", IEEE MTT-S International Microwave Workshop Series on RF and Wireless Technologies for Biomedical and Healthcare Applications (IMWS-BIO), Singapore | doi: 10.1109/IMWS-BIO.2013.6756177, 2013, pp. 1-3.

Yang, Xiaodong et al., "Optimum Design of Wireless Power Transmission System Using Microstrip Patch Antenna Arrays", IEEE Antennas and Wireless Propagation Letters, vol. 16 | doi:10.1109/LAWP.2017.2682262., Mar. 15, 2017, pp. 1824-1827.

Yilmaz, Gurkan et al., "Capacitive Detuning Optimization for Wireless Uplink Communication in Neural Implants", In Advances in Sensors and Interfaces (IWASI), 2013 5th IEEE International Workshop, Jun. 2013, pp. 45-50.

Zhang, Fei et al., "The Relay Effect on Wireless Power Transfer Using Witricity", Digests of the 2010 14th Biennial IEEE Conference on Electromagnetic Field Computation, May 2010, p. 1.

Zhang, Xiu et al., "Quantitative Design and Analysis of Relay Resonators in Wireless Power Transfer System", IEEE Transactions on, 48(11), IEEE Transactions on Magnetics, vol. 48, No. 11, Nov. 2012, pp. 4026-4029.

Zhang, Y. et al., "How eGaN® FETs are enabling large area wireless power transfer", IEEE 5th Workshop on Wide Bandgap Power Devices and Applications (WiPDA), Albuquerque, NM, USA | , doi: 10.1109/WIPDA.2017.8170574, 2017, pp. 366-372.

Zhao, Yi et al., "Low-cost wireless power efficiency optimization of the NFC tag through switchable receiver antenna", Wireless Power Transfer, 5(2) | doi:10.1017/wpt.2018.1, 2018, pp. 87-96.

Zhong, W. X. et al., "Wireless Power Domino-Resonator Systems With Noncoaxial Axes and Circular Structures", IEEE Transactions on Power Electronics, vol. 27, No. 11, Nov. 2012, pp. 4750-4762.

Zhong, Wenxing et al., "General Analysis on the Use of Tesla's Resonators in Domino Forms for Wireless Power Transfer", IEEE Transactions on Industrial Electronics, vol. 60, No. 1 | https://doi.org/10.1109/TIE.2011.2171176, Jan. 2013, pp. 261-270.

\* cited by examiner

SYSTEMS INCLUDING RESONATOR CIRCUITS AND METHODS FOR WIRELESS CHARGING USING SAME

CROSS-REFERENCE TO RELATED APPLICATIONS

This application is a U.S. National Stage of PCT Application No. PCT/US2021/019699 filed Feb. 25, 2021, which claims the benefit under 35 U.S.C. § 119 of the earlier filing date of U.S. Provisional Application Ser. No. 62/983,033 filed Feb. 28, 2020, the entire contents of which are hereby incorporated by reference in their entirety for any purpose.

STATEMENT REGARDING RESEARCH & DEVELOPMENT

This invention was made with government support under Grant Nos. CNS1305072 and CNS1823148, awarded by the National Science Foundation. The government has certain rights in the invention.

TECHNICAL FIELD

Examples described herein relate generally to wireless power charging. Examples of charging systems with relays of resonator circuits are described.

BACKGROUND

A growing number of electronic devices are in use to collect, process, communicate, and/or display data or provide other functionality. Electronic devices, particularly those which are portable, may exhaust their energy supply, and may need to be charged. The need to charge an electronic device may be disruptive to the device's operation and/or usefulness and may cause downtime. Accordingly, convenience mechanisms and systems for charging electronic devices are desired.

DETAILED DESCRIPTION

Linearly arranged passive relay resonators may be able to extend wireless power transfer range. However, extending this relay concept to a 2-D planar and/or 3-D array with the intention to cover a larger area may present challenges. For example, naively constructing a plane of tessellated relays may result in a poor efficiency of power transfer due to complex interactions between relays as the number of relays increases. Examples described herein include electronically reconfigurable relay transmitter systems, which may allow efficient transfer in large relay arrangements and can track a moving receiver across its coverage area. Examples of receiver tracking methods which can scan the entire coverage area over 2000 times per second in some examples and, once found, can configure the relay array to efficiently deliver power to the receiver (e.g. A mobile device) are described.

Magnetic resonance systems are generally a power efficient method of wireless power transfer that does not require close proximity. A magnetic resonance system may include a loop and a coil, where the loop is connected to a power signal and the coil amplifies the magnetic field. A growing demand for charging sensors, medical devices, and robots makes desirable a platform that may deliver power to a moving target in a large space. Passive resonators acting as relays may extend power transfer in one dimension. Examples of reconfigurable relay platforms (e.g. 2D and/or 3D platforms) with adaptively routed power based on receiver location are described herein.

Figure 1:
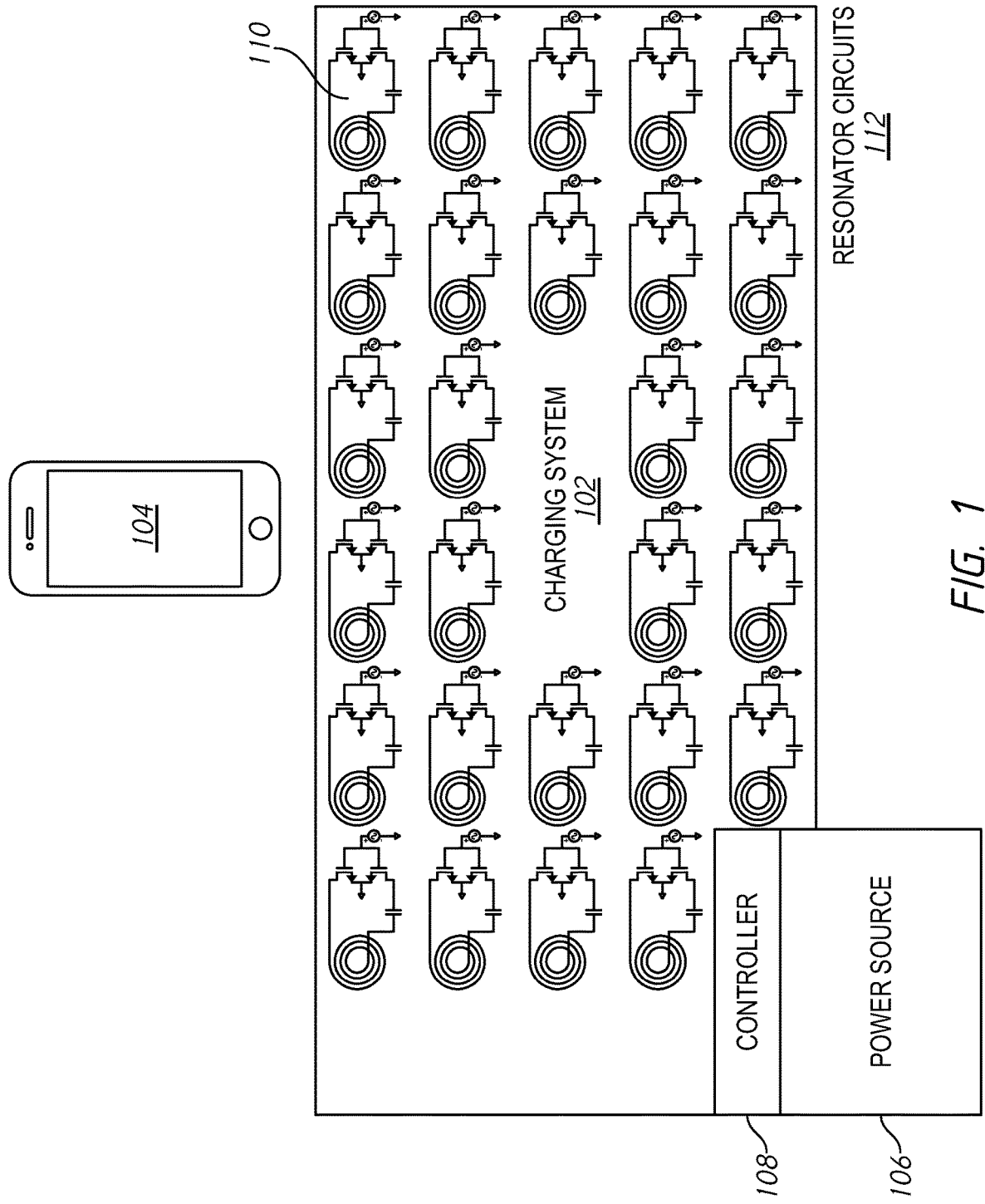
FIG. 1 is a schematic illustration of a system arranged in accordance with examples described herein.

FIG. 1 is a schematic illustration of a system arranged in accordance with examples described herein. FIG. 1 includes charging system 102, mobile device 104, power source 106, controller 108, and resonator circuits 112 including resonator circuits 112. The charging system 102 includes resonator circuits 112 and controller 108 and may be used to charge mobile device 104. Additional, fewer, and/or different components may be included in other examples.

In the example of FIG. 1, mobile device 104 may be powered using the charging system 102. Resonator circuits 112 may be connected to controller 108. The controller 108 may be connected to resonator circuits 112 wirelessly or via physical connection. The controller 108 may activate selected resonator circuits—e.g., by setting and/or selecting a resonant frequency of the activated resonator circuit such that the activated resonator circuit transfers power at an operating frequency. The controller 108 may scan through multiple arrangements of activated resonator circuits to identify a presence of the mobile device 104 and a path of resonator circuits which may be used to power the mobile device 104. When activated, a selected group of the plurality of resonator circuits may deliver power from the power source 106 to the mobile device 104.

Examples of systems described herein may include resonator circuits, such as resonator circuits 112 of FIG. 1, including resonator circuit 110. Resonator circuits may include a resonator and a control circuit. The resonator may be coupled to (e.g., electrically connected to) the control circuit. Resonator circuits may receive power wirelessly, and transfer power to other resonator circuits and/or electronic devices. Twenty-seven resonator circuits are shown in FIG. 1, but any number may generally be used in other examples.

Resonators generally refer to circuits or circuit elements that have a resonant frequency. A resonator that sympathetically resonates when it is placed in an existing oscillating field which has the same frequency as its existing frequency may be referred to as a passive relay. Resonators can convert electrical energy to magnetic fields, which can be received by a device, such as mobile device 104 (e.g., through a resonator incorporated into and/or connected to mobile device 104) and converted back to electrical energy. Resonators may be passive and act as relays which provide for power transfer to another resonator and/or device. Examples of resonators include coils. The coils may be made of a conductive material, such as a metal, such as a metal wire. The coils may contain multiple turns. Any number of turns may generally be used. The coils may have a natural resonant frequency. Resonators may in some examples include a primary and secondary coil. Resonators described herein may in some examples be high Q resonators—e.g., resonators with a high Q value. A high-Q resonator may refer to a resonator with relatively low intrinsic losses and that can store energy for a relatively long time. Since the resonator loses energy at its intrinsic decay rate, $2\Gamma$, its Q, also referred to as its intrinsic Q, nay be given by $Q=\omega/2\Gamma$. The quality factor may also be related to the number of oscillation periods, T, it takes for the energy in the resonator to decay by a factor of e. In some examples, a high-Q value may be Q>100, although other values may also be used.

Generally any size resonator may be used. To cover a fixed array using resonator circuits described herein, the larger each resonator is, generally the fewer number of total relays may be used. In examples where a design goal may be to maximize coverage area and a receiver (e.g., electronic device to be charged) can be close to the charging system, the size of a coil used as a resonator may be selected as a size whose frequency splitting caused by over-coupling starts to disappear with the receiver being very close. If the receiver will be at a distance from the TX plane, the coil size may be chosen in some examples to be the largest that gives the highest energy transfer to the receiver at a given clearance distance. In some examples, coils with the same outer diameter can be made with different Q based on geometry. In some examples, coils may be used having the highest Q value for a given diameter.

Examples of resonator circuits described herein may include one or more resonators and one or more control circuits. For example, a resonator circuit may include a resonator coupled to a control circuit. Examples of control circuits include switches, such as semiconductor circuits containing one or more transistors. A parasitic capacitance of the transistor may be used to change the resonant frequency of the resonator circuit (e.g., the combination of the resonator and the control circuit). Control circuits may be controlled using low power, digital control signals which may place the control circuit into a particular state. The control circuit may have one state in which it presents an amount of impedance to the resonator. For example, the control circuit may close one or more transistors such that parasitic capacitance of the one or more transistors is presented to the resonator. In this state, the resonator circuit (e.g., the resonator and the control circuit) may have a resonant frequency determined by a combination of the resonant frequency of the resonator as modified by the impedance provided by the control circuit (e.g., the parasitic capacitance of one or more transistors). The control circuit may have another state in which it presents a different amount of impedance to the resonator than in the first state. For example, the control circuit may open one or more transistors such that the parasitic capacitance of the transistors is presented to the resonator. In this state, the resonator circuit may have a different resonant frequency determined by the resonant frequency of the resonator as modified by the impedance presented by the control circuit in this state (which may be zero in some examples). It is to be understood that the different impedances presented in the different states and/or the different resonant frequencies of the resonator circuits in the different states may not be constant—e.g., they may vary in accordance with power level or other variations occurring in the system. In one of the states, the resonant frequency of the resonator circuit may be such that the resonator may transmit power at an operating frequency of the charging system (e.g., at a power frequency). In the other state, the resonant frequency of the resonator circuit may be such that the resonator may transmit less power at the operating frequency of the charging system (e.g., half as much power, a third as much power, a quarter as much power, and eighth as much power, and/or no power). Other examples of control circuits include switching circuits which may connect and/or disconnect impedance elements (e.g., one or more transistors, capacitors, inductors, and/or resistors) to the resonator. Generally, digitally-controlled switches may be used as control circuits in some examples.

Accordingly, examples of resonator circuits described herein may have a resonant frequency. The resonant frequency of the resonator circuit may be selected, adjusted, and/or changed using a controller. For example, the controller 108 of FIG. 1 may be used to control a resonant frequency of each of the resonator circuits 112. The resonant frequency of the resonator circuit may be determined by parameters of the resonator and the control circuit. An impedance of the control circuit connected to the resonator may determine in part the resonant frequency of the resonator circuit. The resonator may have a resonant frequency determined in part by its geometry, thickness, material property, or other factors. The control circuit may connect and/or remove impedance from electrical communication with the resonator, which may change a resonant frequency of the resonator circuit. By selecting, adjusting, and/or changing a resonant frequency of each of the resonator circuits, the controller 108 may control which resonator circuits are activated (e.g., able to transmit power at an operating frequency) and which are not (e.g., transmit less or no power at the operating frequency relative to the activated resonator circuits). Accordingly, the controller 108 may activate resonator circuits in generally any pattern, and a pattern may typically be utilized which provides a path from a power source to one or more electronic devices to be charged (e.g., power source 106 to mobile device 104). Activating and/or de-activating resonator circuits may also be referred to as spatial tuning. Examples of resonant frequencies that may be used as operating frequencies include 13.56 MHz, 6.78 MHz, and 27.12 MHz. For example, one or more frequencies in an industrial, scientific, and medical (ISM) band may be used. Other bands may be used in other examples.

Resonator circuits included in charging systems described herein may be arranged in any of a variety of ways. In the example of FIG. 1, the resonator circuits 112 are depicted arranged in generally a grid, although any arrangement may be used. In some examples, resonator circuits may be arranged in a honeycomb pattern (e.g., a hexagonal grid). The arrangement of resonator circuits may be selected to shape and/or extend the resonant field which extends wireless power transfer. The resonator circuits may be arranged in a linear pattern and/or in clusters in some examples. Generally, resonators (e.g., coils) of the resonator circuits may be coplanar in some examples. In some examples, resonators and/or resonator circuits can be oriented in flat, perpendicular, or angled positions, or combinations thereof, relative to each other. The plurality of resonator circuits may be spatially configured in both a 2-D and/or 3-D arrangement. An example of a configuration may be a co-axial configuration, where the resonator circuits (e.g., relays) are on a same axis as a transmitter. This arrangement, which has one path that connects the transmitter and the receiver is referred as 1-leg-n-hop. A plurality of coplanar, electronically reconfigurable resonator circuits may be adaptively switched to the suitable 1-leg-n-hop configuration based on the receiver location (e.g., location of mobile device 104). In one example, a charging system includes nineteen hexagonally arranged coils. Generally, the number of resonators used in a system may be the number that can fill the intended area with the selected unit relay, where the relays may be spaced by a distance at which power can be coupled from one to another (e.g., their critical coupling distance) with their neighboring coils. The relays may also be placed outside or inside their critical coupling distance.

Examples of charging systems described herein may include one or more controllers, such as controller 108 of FIG. 1. Examples of controllers may be implemented using generally any electronics (e.g., circuitry). Examples of controllers include one or more controllers, microcontrollers, processors, and/or custom circuitry such as application specific integrated circuits (ASICs) and/or field programmable gate arrays (FPGAs). The controller may provide control signals to control circuits of resonator circuits. While a single controller 108 is shown in FIG. 1 connected to all resonator circuits 112, generally any number of controllers may be provided, which may be coupled to groups of resonator circuits. Generally, the controller may place a control circuit in one of multiple states, such as one of two states (e.g., open and closed). The controller may switch on and/or off each resonator circuit and/or groups of resonator circuits. The impedance presented by a control circuit to the resonator may be different in each state, such that the resonator circuit has a different resonant frequency in each state. Control signals provided by the controller may configure a control circuit or a plurality of control circuits. The controller may be connected to control circuits through a physical connection, wireless connection, or a combination thereof. Accordingly, the controller may select a path of resonator circuits to activate to provide power to an electronic device. The controller may in some examples implement a control algorithm which may be responsible for switching relay resonators on and off in a predetermined and/or controlled manner. In this manner, a controller may be used to search for the presence of one or more electronic devices to charge and/or a preferred path for activated resonator circuits to provide power to one or more electronic devices. The control algorithm may be implemented, for example, using instructions encoded in computer-readable media (e.g., one or more memories or other storage) and executed by the controller. In some examples, the controller circuitry itself may be arranged to implement the control algorithm(s).

In some examples, controllers described herein may receive signals from one or more resonator circuits. Signals received from one or more resonator circuits may be used by the controller to detect a presence and/or location of one or more electronic devices to charge and/or to select an arrangement of resonator circuits to activate to supply power to the electronic device(s). In some examples, a directional coupler (not shown in FIG. 1) may be provided between one or more resonator circuits and the controller, such as between resonator circuits 112 and controller 108. The directional coupler may provide reflections from the resonator circuits 112 to the controller 108. Reflection coefficients obtained through the directional coupler may be used to detect the presence, absence, and/or location of an electronic device (e.g., mobile device 104 of FIG. 1). In some examples, in addition to or instead of reflection signals, the controller 108 may receive one or more authentication signals from electronic devices, such as from mobile device 104. The authentication signal may provide an indication to the controller 108 that a particular electronic device may be acceptable to charge, and/or may provide information regarding power requirements for an electronic device. For example, an authentication signal may include an indication that payment had been made and/or payment authorization. In some examples, the authentication signal may include a power level of the electronic device (e.g., fraction of power remaining, amount of power needed, etc.). In some examples, the authentication signal may include power parameters desired by the electronic device (e.g., frequency and/or amount of power).

Examples of resonator circuits described herein may be coupled (e.g., electrically connected to) one or more power sources. For example, the resonator circuits 112 of FIG. 1 may be connected to power source 106. The power source 106 may be implemented using, for example one or more batteries, energy-harvesting circuitry, wired power, and/or wireless power receiving circuitry. The power source may generally have an operating frequency, such that when one or more activated resonator circuits has the appropriate resonant frequency, power from the power source may be transmitted by the resonator circuit.

To apply power to a network of resonator circuits, a driven loop may be provided and connected to the power source 106 and positioned to activate an initial one of the resonator circuits (e.g., central one of the resonator circuits). While examples of a driven loop are described herein, in other examples, other impedance matching structures may be used. The driven loop may generally provide impedance matching between power circuitry (e.g., a power amplifier) and a resonator. In this manner, the driven loop may be driven by the power circuitry, and may cause the associated resonator to resonate power to neighboring resonator(s). A frequency at which the initial one of the resonator circuits resonates responsive to the driven loop may be referred to as the operating frequency.

The driven loop may be powered by a power amplifier (which may be coupled to a power source) and the driven loop may be coupled to an initial resonator. The driven loop may be centered among an array of resonators or may be placed at any other location (e.g., on the edge). The driven loop may be implemented using, e.g., a printed circuit board (PCB) trace and/or wire.

While a single charging system is shown in FIG. 1, any number of additional systems of resonator circuits coupled to controllers may be provided and arranged about an environment. In this manner, 3-D coverage for charging electronic devices may be provided. The additional systems may include their own power source and/or may receive power wirelessly from another power source (e.g., power source 106). The controllers of multiple systems may be coordinated to activate resonator circuits in the various systems of resonator circuits—for example, the controllers may be in wireless communication with each other to select a set of resonator circuits for activation in an environment.

During operation, systems described herein may provide power to one or more electronic devices. The electronic devices may also be referred to as mobile devices, which may be able to be carried, transported, held, and/or worn by a person. Electronic devices which may be worn by a person and/or may be implanted in or on a person may be referred to as wearable and/or implantable devices. Generally, the electronic devices to be charged may include or be in communication with a resonator to receive power from one or more of the resonators in the charging system. So for example, the mobile device 104 may include a resonator which may receive power from one or more of the resonator circuits 112. Examples of electronic devices include, but are not limited to, mobile phones, personal computers, portable personal computers, wearable smart devices, audio devices, implanted medical devices, powered toys, portable batteries, electrical lighting, appliances, electric vehicles, robots, remote control devices, electrical tools, media streaming devices, gaming devices, or combinations thereof. Wearable devices which may be charged in accordance with techniques described herein include, but are not limited to, watches, glasses, head-mounted displays (e.g., augmented, virtual, and/or mixed reality headsets), rings, socks, earrings, and/or necklaces. Examples of implanted devices (e.g., implanted medical devices) which may be charged in accordance with systems and/or techniques described herein include one or more neural stimulators and/or one or more left ventricular assist devices (LVAD).

During operation, charging systems described herein may be used to charge one or more electronic devices (e.g., wholly and/or partially charge the devices). For charging, the mobile device may be placed proximate a charging system—for example, the mobile device 104 may be placed proximate charging system 102. Proximate generally refers to in contact or at a distance to where power may be transferred—e.g., from one or more resonant circuits of a charging system, such as charging system 102 to a resonator of a mobile device (e.g., mobile device 104). Examples of distances include within one centimeter of the charging system in some examples, within four centimeters of the charging system in some examples, within one inch of the charging system in some examples. Proximate may not need an unobstructed space between an electronic device and a charging system. For example, a space between an electronic device and a charging system described herein may be wholly and/or partially filled with intervening material—e.g., one or more substrate material(s), case(s), skin, tissue, clothing, air, and/or other fluid. Devices charged proximate a charging system 102 may be stationary or in motion. Proximate may include generally any spatial directions from the charging system. Examples of spatial directions include the transverse plan in some examples, sagittal plane in some examples, frontal plane in some examples.

Multiple paths of resonator circuits may be scanned between a power source and the electronic device. For example, the controller 108 may activate patterns of the resonator circuits 112 in multiple paths between power source 106 and a location of the mobile device 104. In some examples, the controller 108 may scan through multiple paths of activated resonator circuits to identify a charging location corresponding to the mobile device 104. Once a charging location is identified in some examples, then a scan of multiple paths between power source 106 and the charging location may be made. Each path refers to a collection of activated resonator circuits which may transport power from a power source to a charging location. A path may be linear (e.g., a straight line), or may be non-linear (e.g., may include groups or clusters of resonator circuits and/or one or more angles or turns). A path may be scanned by activating it—e.g., by applying control signals to the resonator circuits in the path that cause the resonator circuits to be activated (e.g., to have a resonant frequency suitable for transmitting power at an operating frequency).

The controller may select a path of the multiple scanned paths to use for charging the electronic device. For example, the controller 108 may select a path based on reflected signals received from one or more of the resonator circuits 112. A path may be selected, for example, having a minimum amount of reflected signals from among a group of candidate paths. Other metrics may be used to select a path. In some examples, a path and/or individual resonator circuits in a path, may be selected based on an amount of energy transfer between the electronic device and the path (e.g., between mobile device 104 and one or more of resonator circuits 112). In some examples, a path and/or individual resonator circuits in a path, may be selected based on an amount of power transfer between individual ones of the resonator circuits (e.g., power transfer within the charging system 102).

While the charging of a single mobile device is depicted in FIG. 1, it is to be understood that multiple electronic devices may be charged (e.g., simultaneously and/or partially simultaneously) in other examples. For example, a controller may activate two paths in some examples—one to each of two charging locations. In some examples, a controller may alternate between activation of a path to a first charging location and activation of a path to a second charging location. In some examples, an amount of time each path may be activated may be determined in part by a charging level of the electronic device at the charging location. For example, a controller may activate one path to an electronic device having a lower charge level (e.g., 20 percent charged) longer than another path to a different electronic device having a higher charge level (e.g., 80 percent charged). Other metrics may be used to determine path activation time—e.g., total power need of each device, payment provided by each device, type and/or identity of each device.

Accordingly, FIG. 1 depicts an example of a charging system which may be used to charge a mobile device. In some examples described herein, a charging system may also be referred to as a transmitter—e.g., it is a system which may transmit power during operation. Examples of mobile devices and/or other electronic devices described herein may also be referred to as receivers—e.g., they may receive power during operation.

Examples of charging systems described herein may be designed to provide delivery of power (e.g., efficient delivery of power) to multiple points within an environment and/or to be able to adapt to movement of an electronic device that may be under charge. Examples of systems described herein may be deployed in any number of environments—homes, buildings, streets, hospitals, medical centers, factories, operating rooms, airports, transit centers, etc.

Figures 2A, 2B:
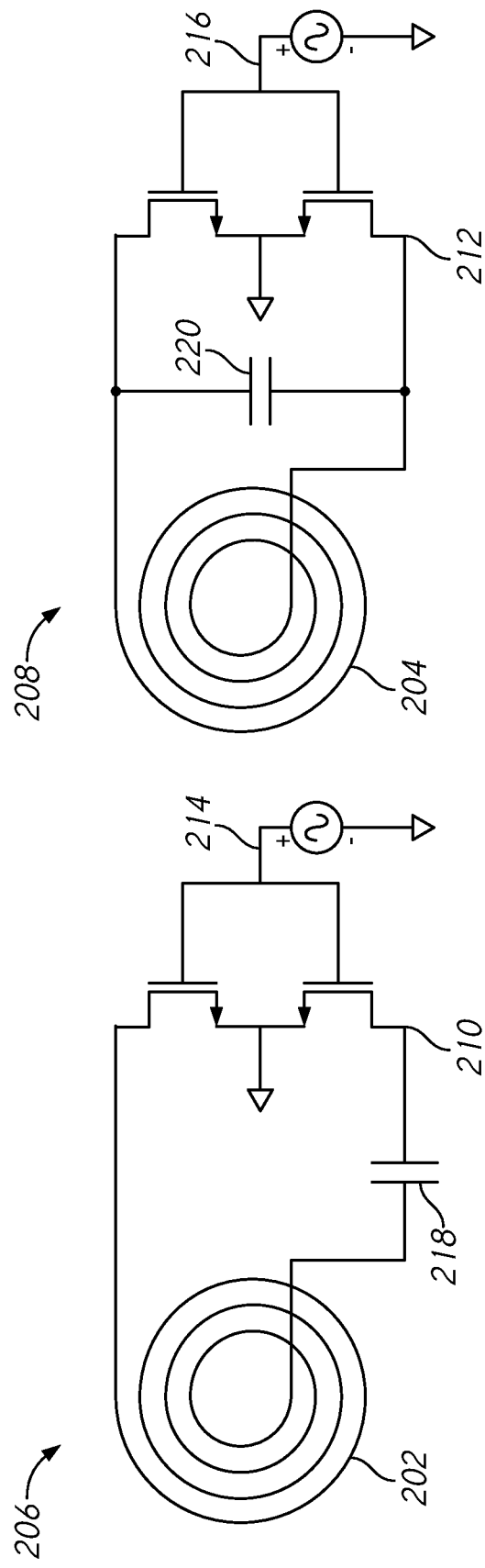
FIG. 2A is a schematic illustration of a resonator circuit arranged in accordance with examples described herein.
FIG. 2B is a schematic illustration of a resonator circuit arranged in accordance with examples described herein.

FIG. 2A is a schematic illustration of a resonator circuit arranged in accordance with examples described herein. The resonator circuit 206 includes resonator 202, capacitor 218, and control circuit 210. The control circuit 210 may receive control signals 214. Controllers described herein may provide the control signals 214. The resonator circuit 206 may be used to implement and/or may be implemented using resonator circuits described herein, including resonator circuit 110 of FIG. 1. Additional, fewer, and/or different components may be used in other examples.

In the example of FIG. 2A, resonator 202 is implemented using a coil. The capacitor 218 is coupled to the resonator 202 and serves as a tuning capacitor which may be sized to permit the resonator 202 to resonate (e.g., transmit power) at a particular operating frequency. While a capacitor is shown, generally any impedance element and/or combination of impedance elements may be used (e.g., resistors, capacitors, and/or inductances).

The control circuit 210 is provided to add and/or subtract impedance to the resonator circuit 206 such that the resonator circuit 206 has generally two states in this example—with the resonator circuit 206 having a different resonant frequency in each state. In one state, the resonator may resonate at the operating frequency (e.g., may transmit power). In the other state, the resonator may resonate at a different frequency, such that power is not transmitted at the operating frequency, or is transmitted at a reduced efficiency.

For example, the control circuit 210 includes two transistors in a series configuration. The transistors may be semiconductor transistors, e.g., semiconductor switches. In the example of FIG. 2A, the two transistors share a source and a gate. In a first state, a controller may provide control signals 214 as a low signal, which may turn off the transistors (e.g., open the semiconductor switches), blocking and/or impeding current flow. The parasitic capacitance of the two transistors of the control circuit 210 in this state may be added to the resonator circuit 206 and may change the resonant frequency of the 206 away from the operating frequency. Generally, an output capacitance of one or more of the transistors in this state may be selected to be smaller than the capacitor 218, such that the resonant frequency may be moved significantly in this state. However, in another state, the controller may provide control signals 214 as a high signal, which may turn on the transistors in the control circuit 210, which may allow current flow. The on transistors may additionally introduce resistance in that current path in some examples. Generally, transistors having a low on-resistance as possible may be used in some examples. In this state, the resonant frequency of the resonator circuit 206 may be such that the resonator 202 resonates power at the operating frequency. Additionally, a voltage breakdown of the transistors used in the control circuit in some examples may be selected such that the control circuit may tolerate the expected voltage across the transistors when the transistors are switched off. Analogous to the described example, in some examples the controller may provide signals 214 as a low signal, which may turn on the transistors, allowing the current to flow. The controller may also provide signals 214 as a high signal, which may turn off the transistors, blocking and/or impeding current flow. This may occur, for example, in examples using depletion mode MOSFET transistors.

FIG. 2B is a schematic illustration of a resonator circuit arranged in accordance with examples described herein. The resonator circuit 208 includes resonator 204, capacitor 220, and control circuit 212. The control circuit 212 may receive control signals 216. Controllers described herein may provide the control signals 216. The resonator circuit 208 may be used to implement and/or may be implemented using resonator circuits described herein, including resonator circuit 110 of FIG. 1. Additional, fewer, and/or different components may be used in other examples.

In the example of FIG. 2B, resonator 204 is implemented using a coil. The capacitor 220 is coupled to the resonator 204 and serves as a tuning capacitor which may be sized to permit the resonator 204 to resonate (e.g., transmit power) at a particular operating frequency. In the example of FIG. 2B, the capacitor 220 is connected in a parallel configuration across the resonator 204 and between the resonator 204 and the control circuit 212. In the example of FIG. 2A, the capacitor 218 had been connected in a series configuration between one end of the resonator 202 and the control circuit 210. While a capacitor is shown, generally any impedance element and/or combination of impedance elements may be used (e.g., resistors, capacitors, and/or inductances). For example, a resistor may be placed in parallel with the capacitor 220 of FIG. 2B in some examples.

The control circuit 212 may operate in an analogous manner to the control circuit 210 described with respect to FIG. 2A, and may receive control signals 216 from a controller.

Note that examples of control circuits described herein, including control circuit 210 of FIG. 2A and control circuit 212 of FIG. 2B include semiconductor devices which may present parasitic capacitances to the resonator circuit even when the switches provided by the semiconductor devices are off, or open. In this manner, a change of state in the resonator circuit may be achieved by adjusting and/or moving a resonant frequency of the resonator circuit toward or away from an operating frequency. This may be in contrast to use of mechanical switches which may physically disconnect a resonator from a power source.

Figure 3:
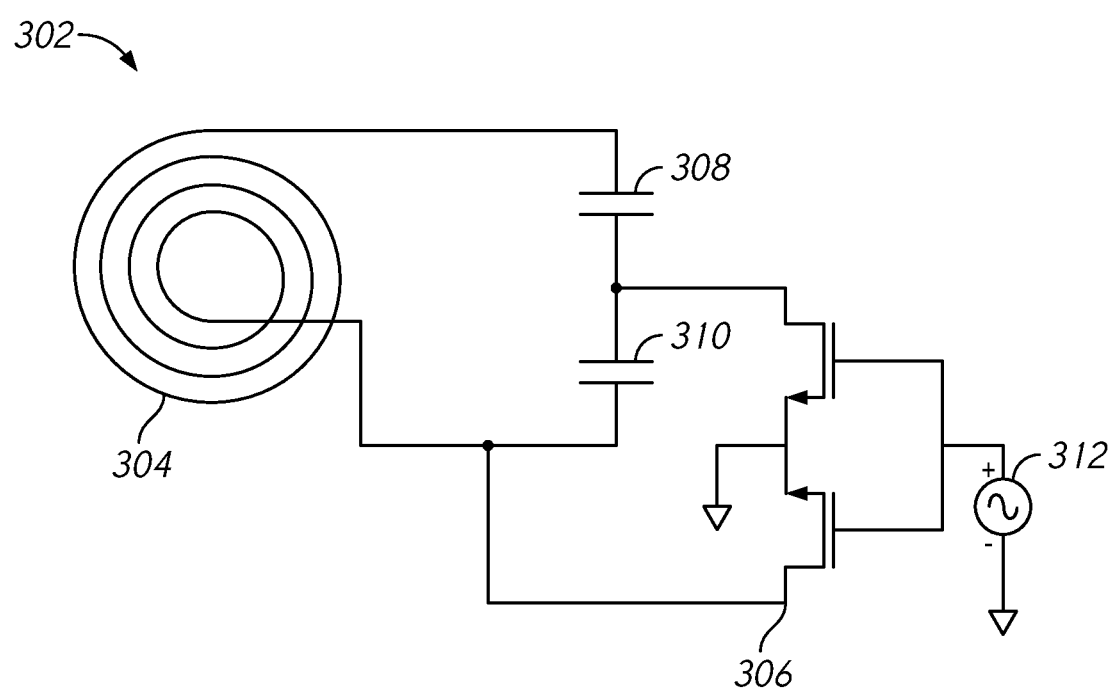
FIG. 3 is a schematic illustration of a resonator circuit arranged in accordance with examples described herein.

FIG. 3 is a schematic illustration of a resonator circuit arranged in accordance with examples described herein. The resonator circuit 302 includes resonator 304, capacitor 308, capacitor 310 and control circuit 306. The control circuit 306 may receive control signals 312. Controllers described herein may provide the control signals. The resonator circuit 302 may be used to implement and/or may be implemented using resonator circuits described herein, including resonator circuit 110 of FIG. 1. Additional, fewer, and/or different components may be used in other examples.

In the example of FIG. 3, resonator 304 is implemented using a coil. The capacitor 308 and capacitor 310 are arranged in series with one another, and the series combination of capacitor 308 and capacitor 310 are in parallel with the resonator 304. The control circuit 306 is arranged in parallel with the capacitor 310.

The capacitor 308 and 310 are coupled to the resonator 304 and serves as a tuning capacitor which may be sized to permit the resonator 304 to resonate (e.g., transmit power) at a particular operating frequency. In the example of FIG. 3, the control circuit 306 is connected in a parallel configuration between the cap 310 and control signal.

The control circuit 306 includes two transistors in a series configuration. The transistors may be semiconductor transistors, e.g., semiconductor switches. In the example of FIG. 3, the two transistors share a source and a gate. In a first state, a controller may provide control signals as a low signal, which may turn off the transistors (e.g., open the semiconductor switches), blocking and/or impeding current flow. In this state, in the example of FIG. 3, opening the semiconductor switches of control circuit 306 may have the effect of placing both capacitor 308 and capacitor 310 in parallel with the resonator 304. Accordingly, a resonant frequency of the resonator circuit 302 may be determined in accordance with a parallel combination of the resonator 304 and capacitor 308 and capacitor 310 (which may be modified by a parasitic capacitance of the switches in the control circuit 306). In another state, the controller may provide control signals as a high signal, which may turn on the transistors in the control circuit 306, which may allow current flow. In this state, the resonator 304 may effectively be in parallel with only the capacitor 308 (e.g., the capacitor 310 may have been shorted out and may not contribute significantly to the resonant frequency of the resonator circuit 302). Accordingly, the resonant frequency of the resonator circuit 302 may be determined by a parallel combination of the resonator 304 and the capacitor 308. The capacitor 308 and capacitor 310 may be sized such that in one state the resonant frequency of the resonator circuit 302 is such that power may be resonated at an operating frequency, but in the other state power is not resonated and/or is resonated to a lesser degree.

In this manner, control circuits described herein may be used to add and/or subtract impedances from a resonator circuit. In one state, the resonator circuit may resonate (e.g., transmit power) at an operating frequency (e.g., a frequency configured to transmit power originated from a resonator circuit driven by a driven loop). In other states, the resonator circuit may resonate at a different resonant frequency which may not transmit power, or may transmit less power, from a resonant circuit resonating at the operating frequency.

Figure 4:
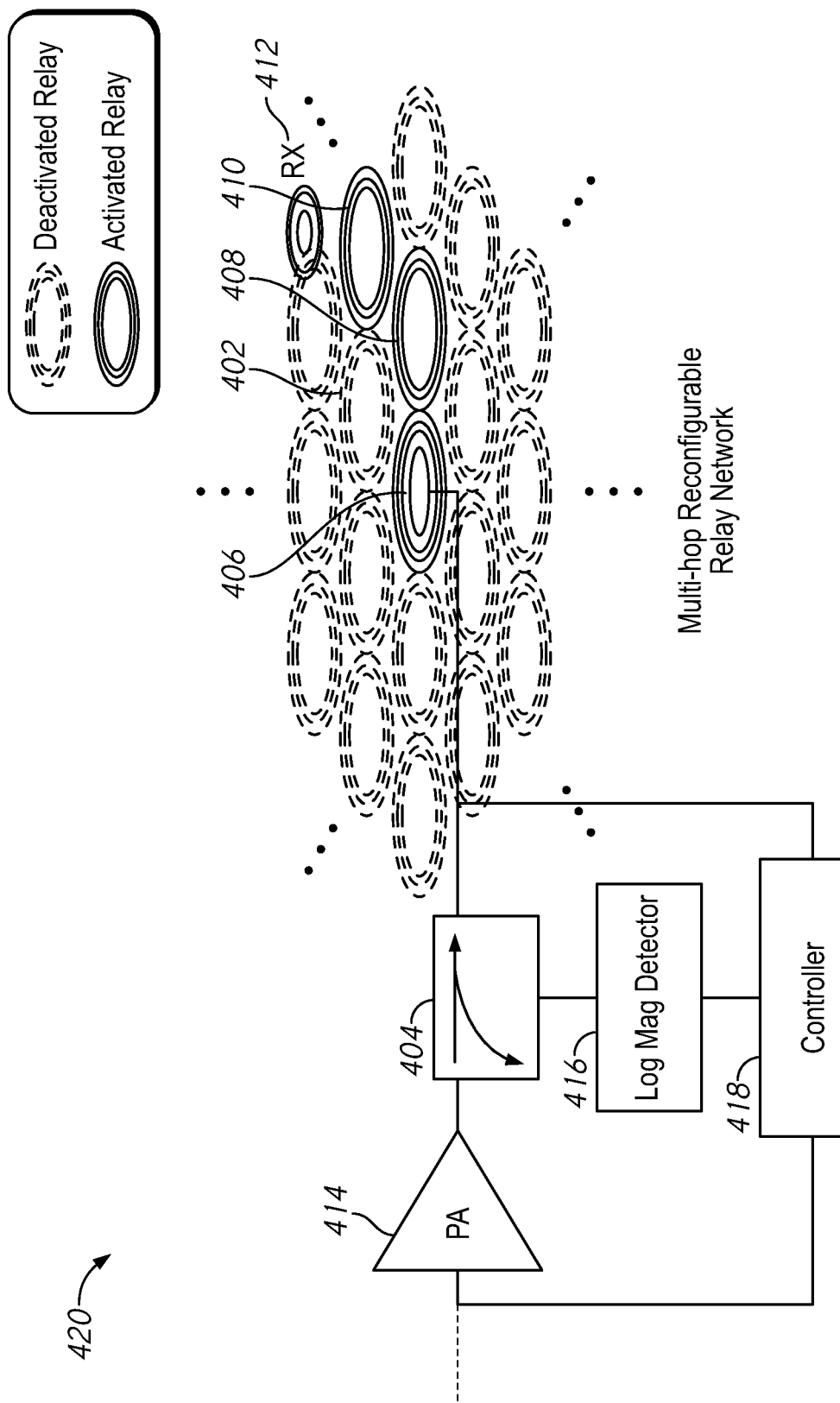
FIG. 4 is a schematic illustration of a charging system arranged in accordance with examples described herein.

FIG. 4 is a schematic illustration of a charging system arranged in accordance with examples described herein. The charging system 420 includes a number of resonator circuits, including resonator circuit 402, resonator circuit 406, resonator circuit 408, and resonator circuit 410. An electronic device may be provided for charging at charge location 412. The charging system 420 includes a directional coupler 404, power amplifier 414, detector 416, and controller 418. The power amplifier 414 may be coupled to and receive power from one or more power sources and be coupled to and provide an amplified signal to directional coupler 404. The directional coupler 404 may be coupled to and receive reflections of power signals from the resonator circuits. The directional coupler 404 may be coupled to the detector 416 and may provide reflections to detector 416 which may in turn be coupled to and provide a measure of reflectance to controller 418. The controller 418 may be coupled to the power source and the resonator circuits, and may activate and/or deactivate the resonator circuits to transmit power along one or more paths. Additional, fewer, and/or different components may be used in other examples.

The charging system 420 may be used to implement and/or may be implemented by the charging system 102 described with respect to FIG. 1. Each of the resonator circuits in the charging system 420 may be implemented in accordance with any of the resonator circuits described with respect to FIG. 1. For example, each of the resonator circuits may include a resonator and a control circuit. Similarly, the controller 418 may be used to implement and/or may be implemented by the controller 108 of FIG. 1 and may operate in accordance with any description provided with respect to FIG. 1. For example, the controller 418 may activate selected ones of the resonator circuits by providing control signals to the resonator circuits which adjust or select a resonant frequency of the resonator circuit to transmit power.

In the example of FIG. 4, the controller 418 has activated three resonator circuits—resonator circuit 406, resonator circuit 408, and resonator circuit 410. These activated resonator circuits provide a path between a power source and the charge location 412. The remainder of the resonator circuits shown in FIG. 4 are not activated, and do not contribute significantly to power transfer between the power source and the charge location 412.

Resonator circuits described herein may also be referred to as relays. Resonator circuits may include resonators, which may also be referred to as relays. Generally, a passive relay is a resonator that may sympathetically resonate when it is placed in an existing oscillating field which has the same frequency as its existing frequency. Relays placed in a particular arrangement may therefore extend the resonant field—e.g., activated resonator circuits described herein may cause power to be transmitted through a resonant field which includes multiple resonator circuits. In some examples, resonator circuits may be arranged in a co-axial arrangement, where the resonators (e.g., relays) are on a same axis as a transmitter and/or power source. However, in some examples, resonator circuits may additionally or instead be arranged in a co-planar arrangement (e.g., with coils positioned in a same plane, as generally depicted in FIG. 1 and FIG. 1). A linear resonator circuit (e.g., relay) arrangement, which has one path that connects the transmitter and the receiver may be referred as 1-leg-n-hop, where n refers to a number of resonators in a path between a power source and a charging location (e.g., n=2 in the example of FIG. 4 where the power source is provided at resonator circuit 406, and must hop through resonator circuit 408 and resonator circuit 410 to reach charge location 412). Other n values may be used in other examples, including 3, 4, 5, 6, 7, 8, 9, 10, 11, 12, 13, 14, 15, or other numbers of resonator hops.

Generally, when an electronic device (e.g., receiver) is positioned proximate a charging location at the end hop, the resonators may form a good power transfer channel at their common resonant frequency. It may be desirable, however, for charging to occur when an electronic device is placed generally at any location proximate the charging system—e.g., the charging location is not predetermined or fixed. Accordingly, to effectively route power throughout a plane, charging systems described herein may use coplanar, electronically reconfigurable resonator circuits (e.g., relays) that may be adaptively switched (e.g., by a controller) to the most suitable 1-leg-n-hop configuration based on the location at which an electronic device (e.g., receiver) is presented for charging. All or portions of resonator circuits (e.g., resonators and/or resonator circuits) may be placed in a hexagonal grid so that spacing between neighboring resonators is generally equal, making each path with the same number of hops generally the same length. In the example of FIG. 4, nineteen hexagonally arranged coils are provided in charging system 420.

A power source is provided in the charging system 420 by driving a loop (e.g., a conductive loop) under one of the resonator circuits. In the example of FIG. 4, the power amplifier 414 drives a loop (e.g., a driven loop) provided under resonator circuit 406. That is, a power source is initially coupled to one of the activated resonator circuits, generally a resonator circuit in a central position relative to other resonator circuits in the system. Accordingly, the resonator circuit 406 may provide an initial power source to neighboring resonator circuits. The controller 418 may switch on and off each relay resonator (e.g., by selecting and/or adjusting a resonant frequency of the resonator circuit). The controller 418 may detect the presence or absence of a receiver on a particular candidate end hop by way of a reflection coefficient. The reflection coefficient may be observed via directional coupler 404 positioned at an output port of the power amplifier 414. In the example of FIG. 4, the resonators in the resonator circuits may have identical geometries, such as five turn PCB coils with a Q of 120 and resonant frequencies of 13.47 MHz in some examples. Other resonators, including other materials, Q value, and/or resonant frequencies may be used in other examples. The resonators in a charging system need not all be identical in some examples.

The arrangement of resonator circuits in FIG. 4 presents an input impedance to the power amplifier 414. The input impedance of the adaptive multi-hop system may be used in predicting and optimizing efficiency, because power amplifier efficiency generally varies with load impedance.

During operation, the controller 418 may scan various paths (e.g., groups) of resonator circuits. A variety of scan patterns may be used. For example, the controller may activate resonator circuits for a particular number of hops (e.g., 1, 2, 3, etc.) in a radial pattern rotating around a center resonator circuit. The presence of an electronic device to be charged (e.g., a receiver) may be detected based on reflections detected by the detector 416 through the directional coupler 404. The detector may be implemented, for example, using a gain and phase detector. The controller 418 may compare reflections of a power signal received from the resonator circuits with a threshold, and based on the comparison, determined that an electronic device to be charged is present at an end hop (e.g., final resonator) of the path. The comparison may be, for example, when the reflections are less than or equal to the threshold value. While scanning in some examples, the input impedance of the relay system may be set at an impedance at which the amplifier dissipates a lower and/or the least power, so reduce any wasted power during scanning to determine the presence of an electronic device. Once a location of the charging device has been detected by the controller 418, the input impedance of the relay system (e.g., the resonator circuits) with the charging device should conjugate-match the output impedance of the power amplifier for optimal efficiency in some examples. To reduce and/or minimize the power consumed while scanning for a receiver, types of patterns used in scanning may be based on a consideration of the power amplifier characteristics and system input impedance. Amplifiers may exhibit differing power consumption with the number of hops being scanned (e.g., 1-hop and/or 2-hop paths). There is a relationship between input impedance of a multi-hop path and the number of hops between power source and charging location. Accordingly, scan patterns may prioritize paths having a number of paths that may reduce power loss.

For example, in an example charging system 420 of FIG. 4, where each resonator circuit includes a 5-turn PCB coil having a Q of 120, and impedance is measured at 13.47 MHz, the impedance of the network of resonator circuits increases for 1-hop paths as the receiver is brought closer to the charging system. However, for 2-hop paths, the input impedance of the network of resonator circuits decreases as the receiver is brought closer to the charging system. In one example, when no receiver (e.g., electronic device to be charged) is present, the input impedance of a 1-hop path is around 12Ω, and the input impedance of a 2-hop path is around 180Ω. In some examples, the controller may prioritize paths having a number of hops where the power consumption is lower than another number of hops. In the example of FIG. 4, the power consumption of both 12 Ω 1-hop paths and 180Ω 2-hop paths was similar using a Class E power amplifier to implement power amplifier 414. Accordingly, in one example, 2-hop paths may be prioritized during scanning because they have a longer range. In other examples, if power consumption was lower using a particular number of hops, paths with that number of hops may be prioritized (e.g., scanned first, before other number of hops). In some examples, a preferred distance from the charging system for placing an electronic device may be determined based on a distance at which the input impedance of the network of resonator circuits best matches the impedance of the power amplifier 414. In the example charging system 420 of FIG. 4 using the example provided particulars for the resonators, the system may have a 50Ω input impedance, which may match an impedance of a Class E implementation of the power amplifier 414 when an electronic device is placed for charging at a proximate distance of 4 cm. Other distances may be used in other examples.

Examples of controllers described herein (e.g., controller 108 of FIG. 1 and/or controller 418 of FIG. 4) may implement methods for locating a receiver (e.g., an electronic device to be charged) and/or identifying a path of resonator circuits to activate between a power source and the receiver. The algorithms used by the controllers may be encoded in computer readable media in some examples and executed by the controller (e.g., microcontroller code, executable instructions, etc.) Techniques used by the controller may be explained in part by considering the multi-hop system as a passive 2-port system, where port 1 is the transmitter (e.g., charging system) and port 2 is the receiver (e.g., electronic device to be charged). By way of explanation, a goal of the charging system may be to optimize an amount of energy reflected transferred from the charging system to the receiver, which may be represented by the S-parameter notation, e.g., $|S_{21}|^2$. However, $S_{21}$ may not be measured during operation in some examples, as it may utilize measurements at both the transmitter and receiver. Accordingly, examples of controllers described herein may utilize Γ as an approximation of $S_{21}$. Γ is notation refers to a reflection coefficient at the charging system (e.g., an amount of energy reflected back to the charging system). Generally Γ, the reflection coefficient, may change with changes in load conditions (e.g., positions of one or more electronic devices to be charged proximate the charging system).

Accordingly, controllers described herein may utilize reflection coefficients to determine the presence of an electronic device to be charged at a location. For example, the controller 418 may receive signals indicative of the reflection coefficient from the directional coupler 404 and detector 416. The controller 418 may scan paths to different end points (e.g., end resonator circuits), and for each path may detect the reflection coefficient. In some examples, the controller 418 may select a path having a particular reflection coefficient (e.g., minimum reflection coefficients of multiple paths) and/or relationship between the reflection coefficient and a threshold (e.g., reflection coefficient below a threshold) to indicate the presence of an electronic device to be charged at the associated end resonator circuit. However, in some examples, the overall reflectance value may not be used. In some examples, the controller 418 may utilize a change in reflectance value to determine the presence of an electronic device to be charged at the associated end resonator circuit. For example, a characterization of each or multiple resonator circuit endpoint may be stored (e.g., in a memory accessible to controller 418). The characterization may indicate a baseline value of reflection coefficient expected when no electronic device to be charged is present at that endpoint. During operation, if the controller 418 detects a change in reflection coefficient corresponding to that endpoint location which exceeds a threshold difference, the controller 418 may determine that an electronic device to be charged is present at that endpoint.

The method may be fast during run time operation but may utilize prior calibration of the system. The tracking algorithm may consist of three sequential tasks: calibration, rough-scanning and focused-scanning. The calibration process may take place once after the manufacture of the relay array, or on each system boot. In calibration, the value of all selected relay configurations may be measured one-by-one and saved as system calibration values. During normal operation, the rough-scanning mode may be the way each receiver search cycle starts. In rough-scanning, it may be switched between a prioritized set of possible configurations until a change is detected from the calibration value. The threshold of change detection may be small. The first configuration in which a change may be detected is called the pilot configuration. The configurations that share any one of the unit relays in the pilot configuration are referred as the related configurations. After the pilot configuration has been identified, the focused-scanning mode is entered, where it may be switched between all the related configurations and may select the one with the largest change for the detected receiver.

In some examples, the method utilized by the controller, such as controller 418 may include three general tasks: calibration, rough-scanning, and/or focused-scanning. Instructions for performing each task may be encoded, e.g., in computer readable media, such as microcontroller code. In some examples, calibration may be performed at a single time after manufacture of the charging system and/or may occur on each system boot and/or at periodic times during operation or the life of the charging system. During calibration, the reflection coefficient (e.g., $\Gamma$) may be measured for each candidate charge location (e.g., resonator circuit endpoint). The reflection coefficient for each selected configuration (e.g., each measured path to each measured resonator circuit endpoint) may be saved as system calibration values (e.g., in a memory accessible to controller 418).

During normal operation, controllers (e.g., controller 418) may implement a rough-scanning procedure. During rough-scanning, the controller may scan through a set of possible configurations (e.g., the controller may activate various candidate paths to candidate endpoint locations). Paths having a particular number of hops expected to have improved impedance matching characteristics to the power amplifier may be prioritized (e.g., scanned first) in some examples. The controller 418 may measure reflection coefficients of each candidate path during operation and compare the measured reflection coefficient to the stored system calibration value for that path and/or charge location. If a change is detected, in some examples a change greater than a threshold, then the controller 418 may determine an electronic device to be charged is present proximate the associated charge location. The configuration where a change was detected may be referred to as a pilot configuration.

During a focused-scanning operation, the controller may activate related configurations to the pilot configuration. The related configurations share at least one resonator circuit in common with the pilot configuration. That is, during rough-scanning, the controller may identify a path having an electronic device predicted to be present at the endpoint. During focused-scanning, the controller may identify a preferred path to the endpoint. Accordingly, during focused-scanning, the controller mat scan (e.g., activate) multiple different paths (e.g., related paths) to the endpoint. A path may be selected which produces a largest change in the reflection coefficient measured by the controller. For example, the controller may measure a reflection coefficient obtained for each of a number of candidate paths to an endpoint identified during rough-scanning. For each candidate path, the reflection coefficient may be compared to a baseline coefficient (e.g., a system calibration value and/or average reflection coefficient). A path may be selected based on these comparisons—e.g., a path producing a largest change from the baseline coefficient may be selected. Just as an example of paths, referring to FIG. 4, controller 418 may identify the presence of an electronic device at charge location 412 corresponding to resonator circuit 410 as an endpoint. Two candidate paths may be (1) from resonator circuit 406 through resonator circuit 408 to resonator circuit 410; and (2) from resonator circuit 406 through resonator circuit 402 to resonator circuit 410. In the example of FIG. 4, the path from resonator circuit 406 through resonator circuit 408 to charge location 412 may have produced a larger change in reflection coefficient (e.g., a lower reflection coefficient) than the path from resonator circuit 406 through resonator circuit 402 to resonator circuit 410. Accordingly, the path from resonator circuit 406 through resonator circuit 408 to charge location 412 may be activated to provide charging to charge location 412 in practice.

Once a path is selected during focused-scanning operation, that path may remain activated and may provide power to an electronic device proximate the charging location. The path may remain continuously activated, and may be periodically activated to provide charging (e.g., the path may be activated and alternated with other activated paths to other charging locations when multiple electronic devices are positioned proximate the charging system).

Any pattern or number of paths may be evaluated in rough-scanning and focused-scanning described herein. In some examples, the controller may periodically scan a number of paths to look for electronic devices to charge (e.g., by cycling through multiple activated paths).

During charging, the controller 418 may continue to monitor the reflection coefficient. If a change in the reflection coefficient occurs (e.g., a change beyond a threshold), and/or if the reflection coefficient returns to within a threshold of a baseline and/or stored system calibration value, the controller 418 may determine the electronic device may have moved. Accordingly, the controller 418 may return to a rough-scanning mode to look for a new location and/or different electronic device for charging.

The design of a relay network (e.g., array of resonator circuits) may proceed taking a variety of factors into consideration. As an example, consider the design of a relay transmitter that targets to deliver power to a receiver that is 2 cm in diameter with a minimum transmitter-to-receiver clearance 2 cm, and the diameter of the transmitter can be no more than 45 cm. Firstly, the relay size options may be calculated based on number of hops. In some examples, resonator size (e.g., coil diameter) may be calculated to be 15 cm, 9 cm, 6.5 cm, 5 cm for 1-hop, 2-hop, 3-hop, and 4-hop networks, respectively. Then the resonator size that has the largest energy transfer to a the given receiver at a given clearance may be used. In one example where the minimum clearance is 2 cm, a coil diameter of 6.5 cm may be used. This results in a 2-hop relay transmitter to cover an area of 45 cm.

Figure 5:
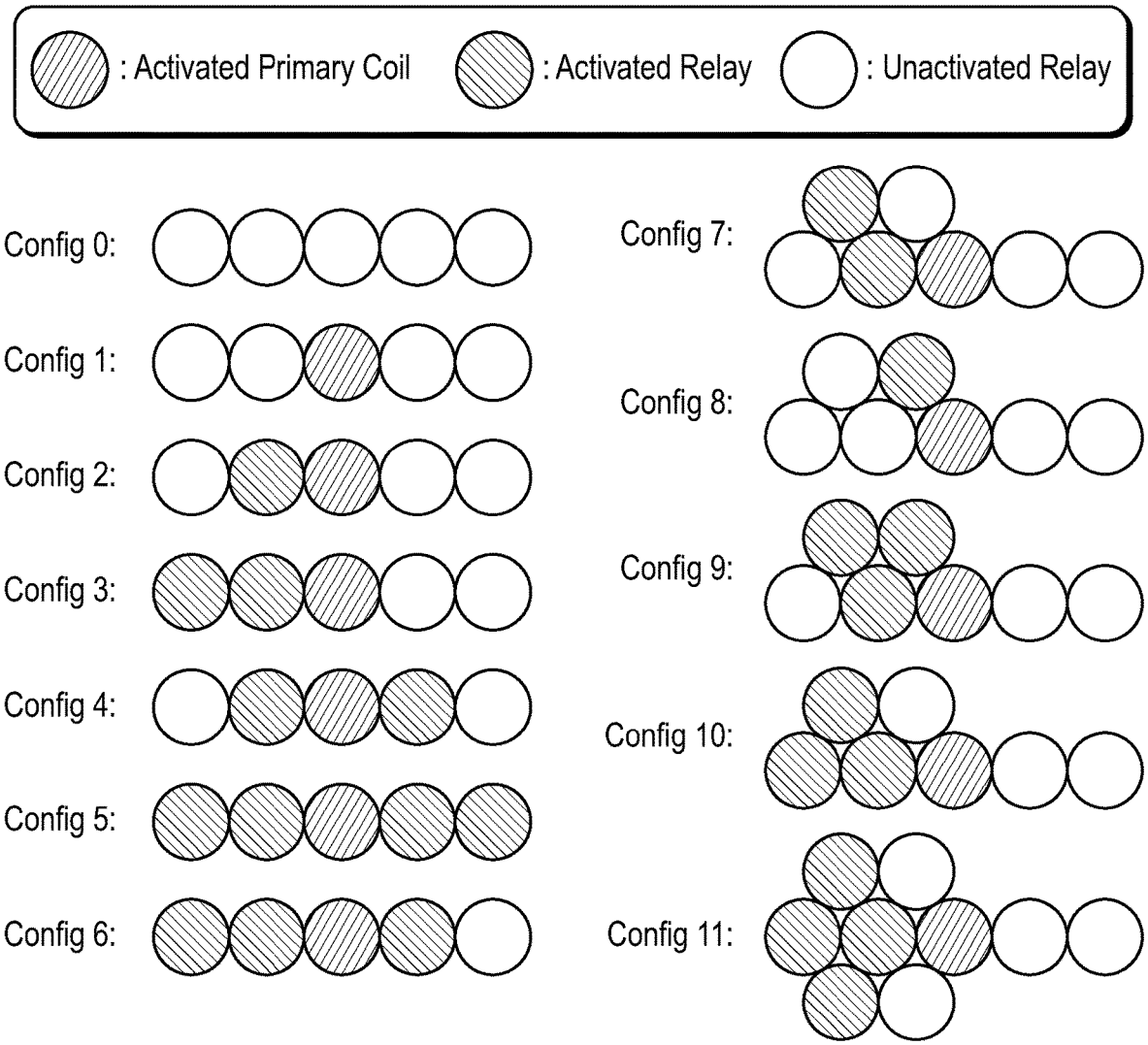
FIG. 5 is a schematic illustration of multiple paths of resonator circuits arranged in accordance with examples described herein.

FIG. 5 is a schematic illustration of multiple paths of resonator circuits arranged in accordance with examples described herein. Controllers described herein may scan and/or utilize multiple paths of resonator circuits. Generally, a path may be a selection of resonator circuits which is activated to provide power to a particular charging location. While, in some examples, the path may include a continuous line, and/or a linear line, of resonator circuits, in other examples, the path may be discontinuous, non-linear, and/or include clusters of resonator circuits (e.g., one or more groups of neighboring resonator circuits). Controllers described herein may utilize reflection coefficients of paths to determine the presence and/or location of an electronic device and/or a preferred path to charge an electronic device. The electromagnetic radiation pattern of the collection of resonator circuits may interact such that a path having a discontinuous, non-linear, and/or clustered grouping of resonator circuits may provide a best electromagnetic strength and/or coupling at the charging location. Moreover, the selection of path may be different based on a distance of a charging location from a surface of the charging system.

In the example of FIG. 5, twelve configurations (e.g., paths) of resonator circuits are shown. For each configuration, an enabled (e.g., driven) primary coil is indicated. That coil may be a location of a power source entry into an array of resonator circuits (e.g., the resonator circuit having a driven loop placed above and/or below the resonator). For each configuration, the enabled resonator circuits (e.g., relays) are also shown. Those enabled resonator circuits refer to those which have been activated by a controller to adjust a resonant frequency of the resonator circuit to a resonant frequency that is able to transmit power at an operating frequency. Disabled resonator circuits (e.g., relays) are also shown in FIG. 5. The disabled resonator circuits are those which have not been activated by a controller to transmit power at the operating frequency. For disabled relays, the controller may have provided a signal to adjust and/or select a resonant frequency of the resonator circuit that does not transmit power at the operating frequency and/or transmits less power at the operating frequency.

The paths shown in FIG. 5 may be implemented by charging systems described herein—e.g., charging system 102 of FIG. 1 and/or charging system 420 of FIG. 4. For example, the controller 108 of FIG. 1 may control charging system 102 to implement the twelve configurations shown in FIG. 5. In another example, the controller 418 of FIG. 4 may control the resonator circuits shown in FIG. 4 to implement the configurations (e.g., paths) shown in FIG. 5. FIG. 5 illustrates eleven configurations. In configuration 0, all relays may be disabled. In configuration 1, only a resonator circuit associated with a driven loop may be activated (e.g., a center resonator circuit). In configuration 2, the resonator circuit associated with a driven loop may be activated as well as one neighboring resonator circuit. In configuration 3, the resonator circuit associated with a driven loop may be activated as well as two neighboring resonator circuits, both on a same side of the initial resonator circuit and extending in a same direction. In configuration 4, the resonator circuit associated with a driven loop may be activated as well as two neighboring resonator circuits, one on either side of the initial resonator circuit. In configuration 5, the resonator circuit associated with a driven loop may be activated as well as four neighboring resonator circuits, two on either side of the initial resonator circuit. In configuration 6, the resonator circuit associated with a driven loop may be activated as well as three neighboring resonator circuits, two on one side of the initial resonator circuit, and one on an opposite side. In configuration 7, the resonator circuit associated with a driven loop may be activated as well as two additional resonator circuits, one adjacent the initial resonator circuit, and another adjacent that one, at an angle. In configuration 8, the resonator circuit associated with a driven loop may be activated as well as an additional resonator circuits, disposed at an angle from the initial resonator circuit. In configuration 9, the resonator circuit associated with a driven loop may be activated as well as three additional resonator circuits, arranged in a cluster. Two of the three additional resonator circuits are adjacent the initial resonator circuit, and one is adjacent those at an angle. In configuration 10, the resonator circuit associated with a driven loop may be activated as well as three additional resonator circuits, arranged in a cluster. One of the three additional resonator circuits is adjacent the initial resonator circuit, and two are adjacent that one at an angle, but not adjacent the initial resonator circuit. In configuration 11, the resonator circuit associated with a driven loop may be activated as well as four additional resonator circuits, arranged in a cluster. One of the four additional resonator circuits is adjacent the initial resonator circuit, and two are adjacent that one at an angle, but not adjacent the initial resonator circuit, and one is adjacent those at an angle—a straight line from the first additional resonator circuit. Note that in all configurations, if a charging location is considered to be proximate a furthest resonator circuit from the initial resonator circuit, all 12 configurations shown in FIG. 5 may be considered '1-hop' or '2-hop' configurations, in that the charging location may be reached in a maximum of two hops, even if more than two resonator circuits are activated. Accordingly, the number of hops used to describe a path may not be equal to the number of resonator circuits activated to form the path.

Figure 6:
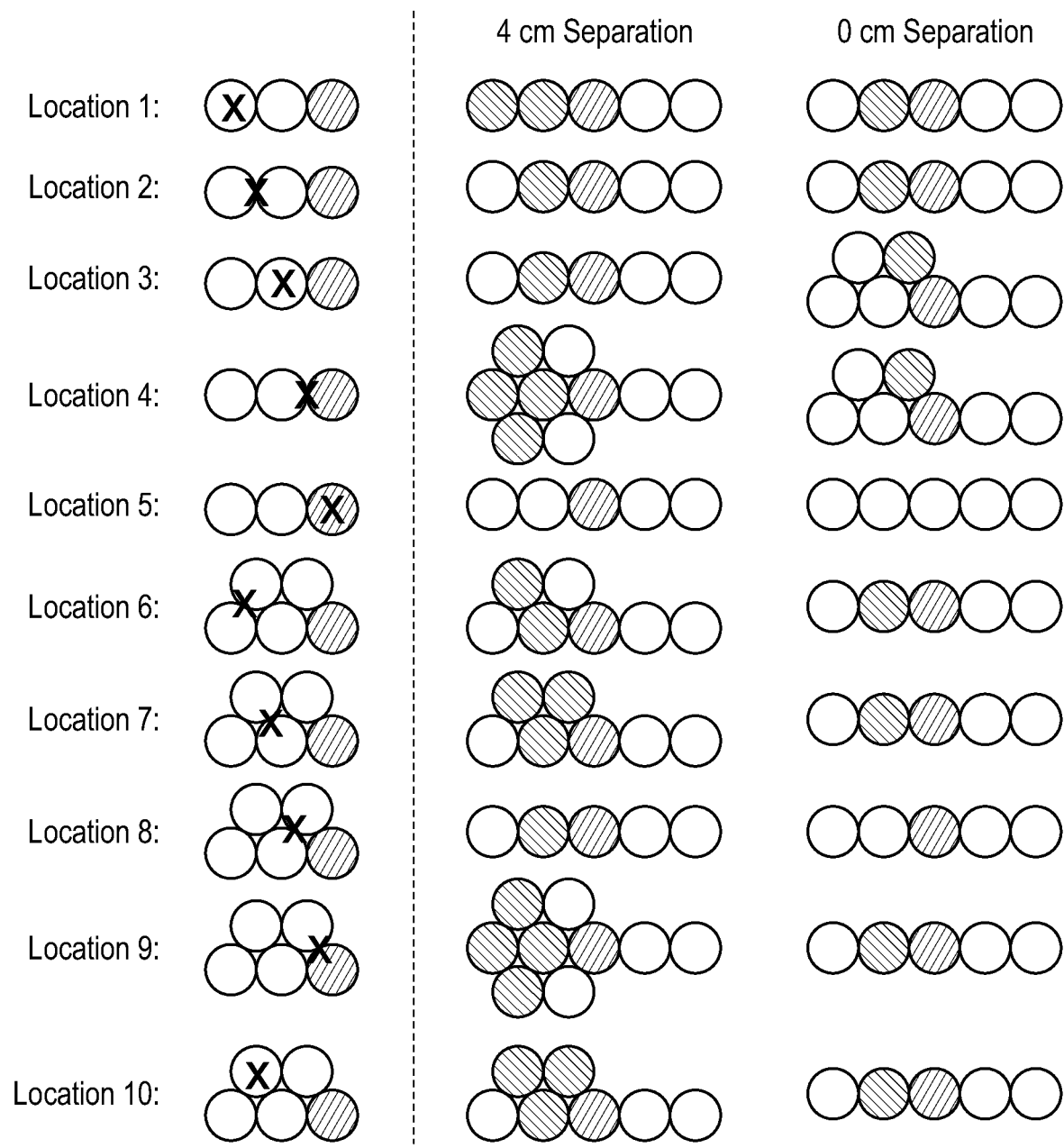
FIG. 6 is a schematic illustration of paths selected for charging based on charging location and distance from the charging system.

FIG. 6 is a schematic illustration of paths selected for charging based on charging location and distance from the charging system. In some examples, a controller may scan through multiple paths (e.g., in a focused-scanning mode) to identify a path which will be activated to provide charge to a particular charging location. The path selected may be based on an evaluation of the reflection coefficient achieved with each path. The performance may vary with frequency, receiver, charging location, and distance from the charging system.

In the example of FIG. 6, a controller may have scanned the 12 configurations of FIG. 5 to identify a preferred configuration (e.g., the configuration having the smallest reflection coefficient and/or greatest change from a baseline reflection coefficient) for charging based on ten different charging locations (shown with an 'X' in FIG. 6). Those preferred configurations are reported in FIG. 6 for a distance of 4 cm and 0 cm (e.g., in contact with the charging system).

For charging location 1, an electronic device to be charged may be positioned above a resonator circuit two circuits away from an initial resonator circuit (e.g., a resonator circuit positioned to resonate responsive to a driven loop). At this location, in this example, the optimal path was configuration 3 of FIG. 5 when the charging device was positioned 4 cm from the charging system, and configuration 2 of FIG. 5 when the charging device was in contact with the charging system.

For charging location 2, an electronic device to be charged may be positioned above a midpoint between two resonator circuits extending away from an initial resonator circuit. At this location, in this example, the optimal path was configuration 2 of FIG. 5 when the charging device was positioned 4 cm from the charging system, and also configuration 2 of FIG. 5 when the charging device was in contact with the charging system.

For charging location 3, an electronic device to be charged may be positioned above a resonator circuit adjacent an initial resonator circuit. At this location, in this example, the optimal path was configuration 2 of FIG. 5 when the charging device was positioned 4 cm from the charging system, and configuration 8 of FIG. 5 when the charging device was in contact with the charging system.

For charging location 4, an electronic device to be charged may be positioned above a midpoint between an initial resonator circuit and an adjacent resonator circuit. At this location, in this example, the optimal path was configuration 11 of FIG. 5 when the charging device was positioned 4 cm from the charging system, and configuration 8 of FIG. 5 when the charging device was in contact with the charging system.

For charging location 5, an electronic device to be charged may be positioned above an initial resonator circuit positioned to resonate responsive to a driven loop. At this location, in this example, the optimal path was configuration 1 of FIG. 5 when the charging device was positioned 4 cm from the charging system, and configuration 0 of FIG. 5 when the charging device was in contact with the charging system.

For charging location 6, an electronic device to be charged may be positioned above a midpoint between resonator circuits two hops from the initial resonator circuit. At this location, in this example, the optimal path was configuration 7 of FIG. 5 when the charging device was positioned 4 cm from the charging system, and configuration 2 of FIG. 5 when the charging device was in contact with the charging system.

For charging location 7, an electronic device to be charged may be positioned above a midpoint between resonator circuits adjacent to one another at an angle, and one being adjacent to the initial resonator circuit. At this location, in this example, the optimal path was configuration 9 of FIG. 5 when the charging device was positioned 4 cm from the charging system, and configuration 2 of FIG. 5 when the charging device was in contact with the charging system.

For charging location 8, an electronic device to be charged may be positioned above a midpoint between resonator circuits adjacent to one another at an angle, and each being adjacent to the initial resonator circuit. At this location, in this example, the optimal path was configuration 2 of FIG. 5 when the charging device was positioned 4 cm from the charging system, and configuration 1 of FIG. 5 when the charging device was in contact with the charging system.

For charging location 9, an electronic device to be charged may be positioned above a midpoint between an initial resonator circuits and another resonator circuit adjacent to the initial resonator circuit at an angle. At this location, in this example, the optimal path was configuration 11 of FIG. 5 when the charging device was positioned 4 cm from the charging system, and configuration 2 of FIG. 5 when the charging device was in contact with the charging system.

For charging location 10, an electronic device to be charged may be positioned above a resonator circuit two hops from an initial resonator circuit—one hop adjacent along a straight line, and another at an angle. At this location, in this example, the optimal path was configuration 9 of FIG. 5 when the charging device was positioned 4 cm from the charging system, and configuration 2 of FIG. 5 when the charging device was in contact with the charging system.

In this manner, controllers may select paths (e.g., collections of activated resonator circuits) that may vary based on receiver, frequency, distance, and charging location.

IMPLEMENTED EXAMPLES

Figure 7:
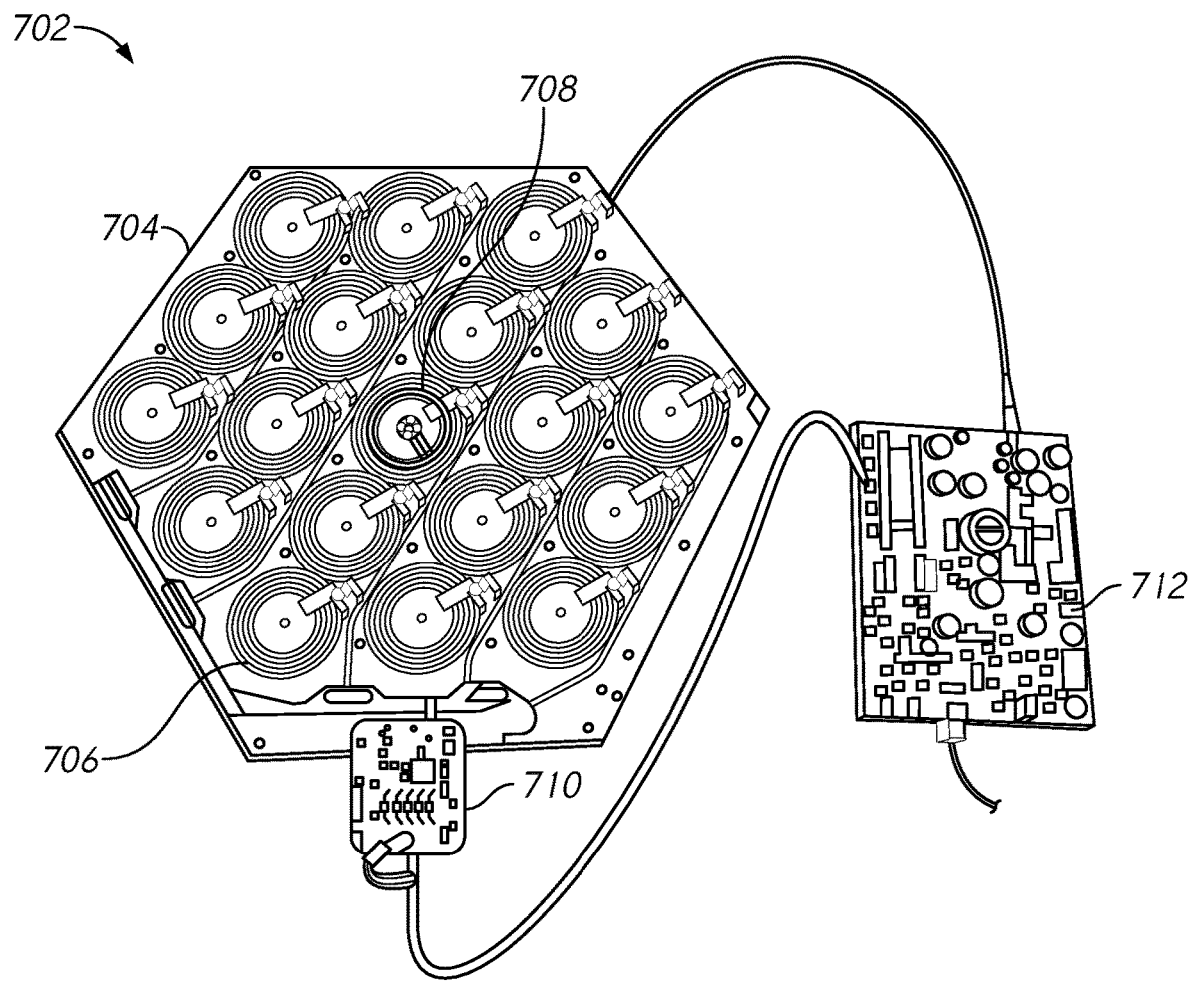
FIG. 7 is a schematic illustration of a charging system arranged in accordance with an implemented example described herein.

FIG. 7 is a schematic illustration of a charging system arranged in accordance with an implemented example described herein. The charging system 702 includes relay array 704. The relay array 704 includes multiple resonators, including coil 706. Driven loop 708 is positioned under a central relay of the relay array 704. The charging system 702 further includes controller 710 coupled to the relay array 704 and power circuitry 712 coupled to the controller 710 and the relay array 704. Additional, fewer, and/or different components may be included in other examples.

The charging system 702 may be used to implement and/or implemented by charging systems described herein, such as charging system 102 of FIG. 1 and/or charging system 420 of FIG. 4. For example, the relay array 704 may include resonators and resonator circuits as described with reference to FIG. 1 and/or FIG. 4. The controller 710 may be implemented by and/or used to implement any controller described herein, including controller 418 of FIG. 4 and/or controller 108 of FIG. 1.

Accordingly, charging system 702 includes a reconfigurable relay board, e.g., relay array 704 and a relay control board, e.g., controller 710. Relay array 704 was implemented on a four-layer PCB, with nineteen hexagonally arranged coils, and a diameter of 31 cm at its widest point. Each coil had five turns and a diameter of 59 mm. The driven loop 708 was mounted under the center coil of the board, and was connected in series with a 91 pF tuning capacitor and a control circuit including a pair of BUK7K134-100E MOSFET switches that share a source and gate. When the gate voltages are high, the series switches allowed current flow and the relay may resonate. When the gate voltages are low, the switches block current flow, pushing the resonant frequency away from the system's operating frequency and effectively shutting off the relay. The control signals that reconfigure all relays may be generated by the microcontroller, then level shifted to 10 V. The power circuitry 712 includes a signal source and an amplifier. At the output of the power amplifier, a directional coupler is connected to compute the reflection coefficient.

A power signal was provided by a power transmitter (e.g., power circuitry 712) including a signal source and a Class E amplifier designed for a 50Ω load. At an output of the power amplifier, a SYDC-20-22-HP+ directional coupler was connected in series. The reflection coefficient from the coupler was processed by an AD8302 gain and phase detector. The controller 710 was implemented using a TI MSP432P401R, which had a 1-Msps, 14 bit ADC, and was used to collect samples from an output of the gain and phase detector (e.g, from power circuitry 712). The control algorithm may be implemented using a microcontroller. The microcontroller may be used to collect samples from the output of the gain and phase detector. A monolithic RC low pass filter, implemented in this example using an ELK-EV333FA, was placed between the detector and ADC to reduce noise at the carrier frequency. For each reflection coefficient data point, seven consecutive samples were taken and digitally averaged to further reduce the impact of noise. The controller firmware utilized 5.7 kB of MSP432 program memory.

The calibration procedure was triggered once on system power-on and used to provide the baseline reflection coefficient value for each configuration. Once a possible receiver has been identified in the rough scanning mode, the algorithm transitioned to a focused scanning mode. At the end of the focused scan the prototype remained in the configuration which best targets the receiver. The prototype continued sampling the reflection coefficient until it observed a significant change, which may indicate that the receiver has moved, at which point it may return to rough scanning mode.

An electronic device (e.g., a receiver) was used for charging using the charging system 702. The receiver used in the experimentation included an eight-turn PCB coil with 2 cm diameter and Q of 90. The receiver was separated by 5 mm and 1.6 cm respectively above the single transmitter and the relay transmitter for the measurements. The locations that are near the center of each relay coil had better efficiency of power delivery to the receiver than locations in between relays.

The rough scanning mode of controller 710 scanned the entire search space 2083 times per second. Once a pilot configuration was found, the focused scan took only 120 microseconds. With this fast tracking algorithm, power was automatically routed to the receiver as it moves, at a rate faster than the eye can detect.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. It is also to be understood that the term coupled typically refers to the components being in electrical communication. Just because components are stated as coupled does not mean that electromagnetic coupling (e.g., matching) has occurred. Also, signals may be provided directly to and/or received directly from the recited components without intervening components, but also may be provided to and/or received from the certain components through intervening components.

What is claimed is:

1. An apparatus comprising:
   a plurality of resonator circuits, each comprising:
      a resonator; and
      a control circuit comprising at least one transistor, wherein the at least one transistor comprises a parasitic capacitance, and wherein the at least one transistor is coupled to the resonator; and
   a controller coupled to the plurality of resonator circuits, the controller configured to provide control signals to the control circuit of each of the plurality of resonator circuits, the control signals configured to control:
      selected ones of the plurality of resonator circuits to add the parasitic capacitance to an impedance of the selected ones to have a first resonant frequency, wherein the first resonant frequency is configured to transmit power at an operating frequency; and
      other ones of the plurality of resonator circuits to subtract or remove the parasitic capacitance from an impedance of the other ones to have a second resonant frequency;
      wherein the controller is further configured to receive reflections or reflection coefficients from each of the resonator circuits, and wherein the controller is further configured to scan through multiple arrangements of activated resonator circuits of the plurality of resonator circuits to identify a presence, an absence, a location, or combinations thereof of one or more electronic devices using the reflection coefficients.

2. The apparatus of claim 1, wherein each of the plurality of resonator circuits includes a coil.

3. The apparatus of claim 1, wherein each of the plurality of resonator circuits has a high Q value.

4. The apparatus of claim 1, wherein the plurality of resonator circuits are arranged in a honeycomb pattern.

5. The apparatus of claim 1, wherein the plurality of resonator circuits are oriented in flat, perpendicular, angled positions, or combinations thereof, relative to each other.

6. The apparatus of claim 1, wherein an arrangement of the selected ones of the plurality of resonator circuits are configured to provide the path between a power source and a charge location.

7. The apparatus of claim 1, wherein the control circuit comprises a switch.

8. The apparatus of claim 1, wherein the controller is configured to select the selected ones of the plurality of resonator circuits based on reflections from the plurality of resonator circuits.

9. The apparatus of claim 8, further comprising a directional coupler coupled between the controller and the plurality of resonator circuits, the directional coupler configured to provide the reflections to the controller.

10. The apparatus of claim 1, wherein the controller is configured to authenticate an authentication signal.

11. The apparatus of claim 1, wherein the power is received wirelessly.

12. The apparatus of claim 1, wherein the power is provided by a battery.

13. The apparatus of claim 1 further comprises:
   wherein the controller is further configured to:
      receive an authentication signal regarding a power level of one or more electronic devices; and
      form a path, using the selected ones of the plurality of resonator circuits, from a power source to a location of the one or more electronic devices for power delivery in accordance with the power level.

14. The apparatus of claim 1, wherein the controller is further configured to selectively turn on or off the at least one transistor of the control circuit to selectively activate or deactivate each of the plurality of resonator circuits.

15. The apparatus of claim 1 further comprises a directional coupler, wherein the directional coupler is configured to provide the reflections or the reflection coefficients from each of the resonator circuits to the controller.

16. A method comprising:
   place an electronic device proximate a charging system, the charging system comprising a plurality of resonator circuits, wherein each of the plurality of resonator circuits comprises a control circuit with at least one transistor and a resonator, and wherein the at least one transistor is coupled to the resonator;
   receive reflections or reflection coefficients from each of the resonator circuits of the charging system;
   scan multiple paths of resonator circuits between a power source and the electronic device;
   responsive to the scanning, identify a presence, an absence, a location or combinations thereof of the electronic device in relation to the charging system using the reflection coefficients; and
   select a selected path of the multiple paths based on energy transfer between resonator circuits in the selected path, wherein said selecting comprises adding a parasitic capacitance of the at least one transistor to an impedance of the control circuit of each resonator circuit in the selected path.

17. The method of claim 16, wherein the selected path comprises a non-linear arrangement of resonator circuits of the plurality of resonator circuits.

18. The method of claim 16, wherein said selecting further comprising:
   activate the resonator circuits in the selected path; and
   deactivate other resonator circuits outside the selected path.

19. The method of claim 18, wherein the plurality of resonator circuits activated is based on an amount energy transfer between the electronic device and the plurality of resonator circuits.

20. The method of claim 18, wherein the plurality of resonator circuits activated are based on an amount of power transfer between individual ones of the plurality of resonator circuits.

21. The method of claim 16, further comprising:
place a second electronic device proximate the charging system; and
activate further ones of the plurality of resonator circuits to provide another path between the power source and the second electronic device.

22. The method of claim 16, wherein the electronic device comprises a mobile phone.

23. The method of claim 16, further comprising contacting the electronic device to the charging system.

24. The method of claim 16, further comprising placing the electronic device a distance from the charging system, wherein the distance is such that power transfer occurs between the charging system and the electronic device.

25. The method of claim 16, wherein controlling an impedance of the selected control circuits comprises controlling semiconductor circuits coupled to the plurality of resonator circuits to adjust the impedance.

26. The method of claim 16, wherein the electronic device comprises an implanted medical device comprising a left ventricular assist device (LVAD), a neural stimulator, or combinations thereof.

27. The method of claim 16 further comprises:
receive an authentication signal from the electronic device indicative of a power level of the electronic device; and
deliver an amount of power to the electronic device using the path, wherein the amount of power is based in part on the power level.

* * * * *